(12) United States Patent
Yaroshchuk et al.

(10) Patent No.: US 11,579,511 B2
(45) Date of Patent: Feb. 14, 2023

(54) MULTIFOCAL SYSTEM USING ADAPTIVE LENSES

(71) Applicant: Meta Platforms Technologies, LLC, Menlo Park, CA (US)

(72) Inventors: Oleg Yaroshchuk, Kyiv (UA); Junren Wang, Kirkland, WA (US); Lu Lu, Kirkland, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 17/399,735

(22) Filed: Aug. 11, 2021

(65) Prior Publication Data

US 2021/0373414 A1 Dec. 2, 2021

Related U.S. Application Data

(63) Continuation of application No. 17/022,085, filed on Sep. 16, 2020, now Pat. No. 11,194,222, which is a continuation of application No. 16/265,435, filed on Feb. 1, 2019, now Pat. No. 10,852,619.

(60) Provisional application No. 62/754,414, filed on Nov. 1, 2018.

(51) Int. Cl.
*G02F 1/29* (2006.01)
*G02B 27/01* (2006.01)

(52) U.S. Cl.
CPC ........... *G02F 1/29* (2013.01); *G02B 27/0172* (2013.01); *G02F 1/294* (2021.01); *G02F 2203/06* (2013.01); *G02F 2203/07* (2013.01)

(58) Field of Classification Search
CPC .......... G02F 1/133526; G02B 27/0955; H01L 51/5275
See application file for complete search history.

(56) References Cited

U.S. PATENT DOCUMENTS

| | | | |
|---|---|---|---|
| 2009/0147373 | A1 | 6/2009 | Rolland et al. |
| 2015/0323803 | A1 | 11/2015 | Tung et al. |
| 2017/0293145 | A1 | 10/2017 | Miller et al. |
| 2017/0371076 | A1 | 12/2017 | Hua et al. |

(Continued)

FOREIGN PATENT DOCUMENTS

| | | |
|---|---|---|
| CN | 108474956 A | 8/2018 |
| CN | 108490611 A | 9/2018 |

(Continued)

OTHER PUBLICATIONS

International Preliminary Report on Patentability for International Application No. PCT/US2019/057774, dated May 14, 2021, 12 Pages.

(Continued)

*Primary Examiner* — Mariam Qureshi
(74) *Attorney, Agent, or Firm* — Millburn IP PLLC

(57) ABSTRACT

A device is provided. The device includes a first lens assembly controllable to switch between a first plurality of optical powers. The first lens assembly includes a plurality of directly optically coupled lenses, and is configured to converge or diverge a light transmitted therethrough. The device also includes a second lens assembly coupled with the first lens assembly, and controllable to switch between a second plurality of optical powers that are opposite to the first plurality of optical powers.

19 Claims, 20 Drawing Sheets

(56) References Cited

U.S. PATENT DOCUMENTS

| | | | |
|---|---|---|---|
| 2018/0239177 A1* | 8/2018 | Oh | G02B 6/0056 |
| 2018/0246354 A1 | 8/2018 | Popovich et al. | |
| 2018/0284464 A1 | 10/2018 | Lu et al. | |
| 2018/0356639 A1 | 12/2018 | Schaefer et al. | |
| 2019/0129178 A1* | 5/2019 | Patterson | G02F 1/29 |
| 2019/0227375 A1 | 7/2019 | Oh et al. | |
| 2019/0287495 A1* | 9/2019 | Mathur | G09G 5/391 |
| 2021/0157141 A1 | 5/2021 | Li | |

FOREIGN PATENT DOCUMENTS

| | | |
|---|---|---|
| EP | 1870740 A1 | 12/2007 |
| EP | 3091740 A1 | 11/2016 |
| WO | 2018231784 A1 | 12/2018 |

OTHER PUBLICATIONS

International Search Report and Written Opinion dated Mar. 24, 2020, in corresponding International Application No. PCT/US2019/057774, filed on Oct. 24, 2019 (16 pages).

Fan, F., et al., "Low voltage tunable liquid crystal lens," Optics Letters, vol. 38, No. 20, Oct. 15, 2013, pp. 1116-4119 (4 pages).

Honma, M., et al., "Liquid-crystal variable-focus lenses with a spatially-distributed tilt angles," Optics Express,vol. 17, No. 13, Jun. 22, 2009, pp. 10998-11006 (9 pages).

Tseng, M-C., et al., "Tunable lens by spatially varying liquid crystal pretilt angles," Journal of Applied Physics, 109, pp. 083109-1 to 083109-5 (2011) (5 pages).

Lu, L., et al., "Surface localized polymer aligned liquid crystal lens," Optics Express, vol. 21, No. 6, Mar. 25, 2013, pp. 7133-7138 (6 pages).

Sato, S., "Liquid-crystal lens-cell with variable focal length," Japanese Journal of Applied Physics, vol. 18, No. 9, Sep. 1979, pp. 1679-1684 (6 pages).

Pishnyak, O., et al., "Electrically tunable lens based on a dual-frequency nematic liquid crystal," Applied Optics, vol. 15, No. 19, Jul. 1, 2006, pp. 4576-4582 (7 pages).

Gao, K., et al., "Nonmechanical zoom lens based on Pancharatnam phase effect," Applied Optics, vol. 55, No. 5, Feb. 10, 2016, pp. 1145-1150 (6 pages).

Gao, K., et al., "Thin-film Pancharatnam lens with low f-number and high quality," Optics Express, vol. 23, No. 20, Oct. 5, 2015, pp. 26086-26094 (9 pages).

Ke, Y., et al., "Optical integration of Pancharatnam-Berry phase lens and dynamical phase lens," Applied Physics Letters, 108, pp. 101102-1 to 101102-5 (2016) (5 pages).

Chou, J., et al., "Electrically switchable diffractive waveplates with metasurface aligned liquid crystals," Optics Express, vol. 24, No. 21, Oct. 17, 2016, pp. 24265-24273 (9 pages).

Kim, D-W., et al., "Polarization-insensitive liquid crystal Fresnel lens of dynamic focusing in an orthogonal binary configuration," Applied Physics Letters, 88, pp. 203505-203507 (2006) (3 pages).

Wang, X-Q., et al., "Switchable Fresnel lens based on hybrid photo-aligned dual frequency nematic liquid crystal," Optcal Materials Express, vol. 7, No. 1, Jan. 1, 2017, pp. 8-15 (8 pages).

Li, L., et al., "Liquid crystal lens with concentric electrodes and inter-electrode resistors," Liquid Crystals Review, 2014, vol. 2, No. 2, pp. 130-154 (25 pages).

European Search Report for European Patent Application No. 22153596.6, dated Apr. 6, 2022, 5 pages.

Office Action dated Sep. 30, 2022 for Chinese Application No. 201980087607.9, filed Oct. 24, 2019, and English summary of the Office Action (11 pages).

\* cited by examiner (Real World)

(3D Display)

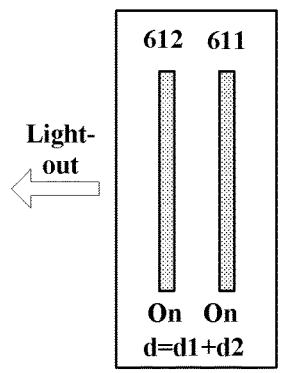
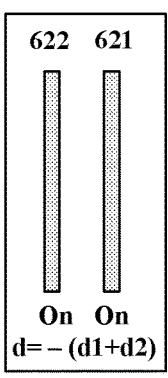
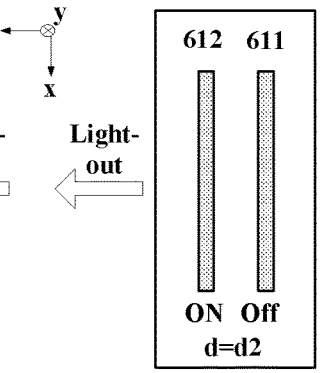
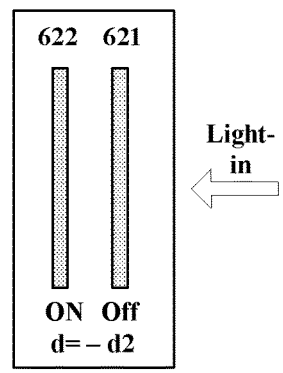
FIG. 6B
FIG. 6C
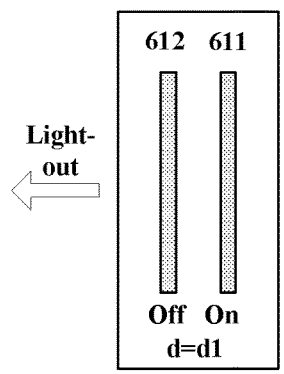
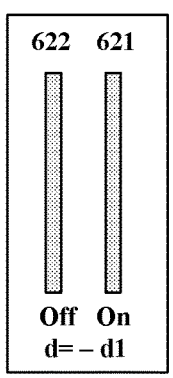
FIG. 6D
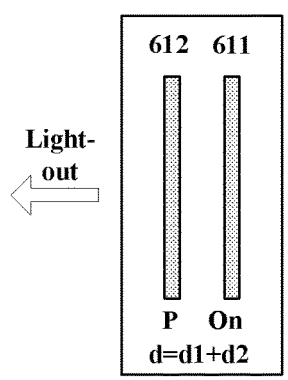
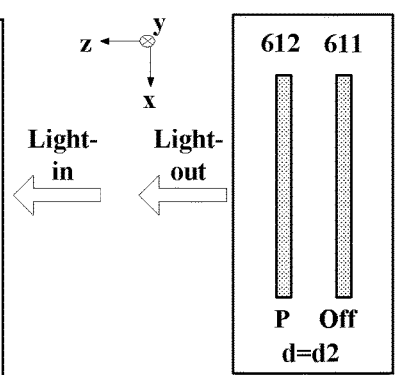
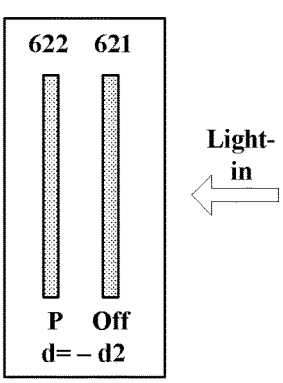
FIG. 6E
FIG. 6F

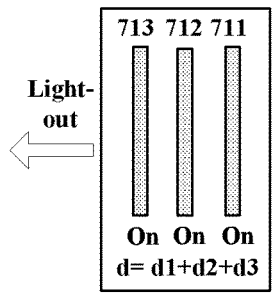 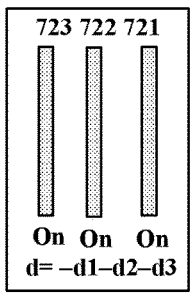 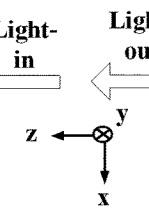 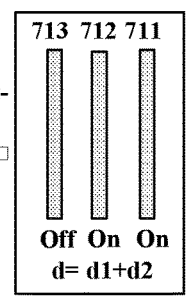 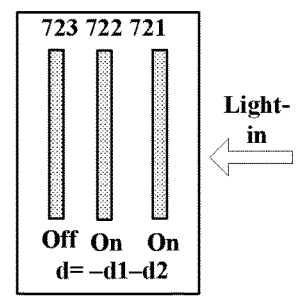
FIG. 7B    FIG. 7C
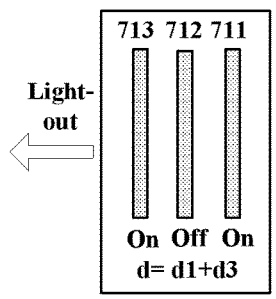 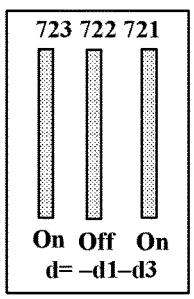
FIG. 7D    FIG. 7E
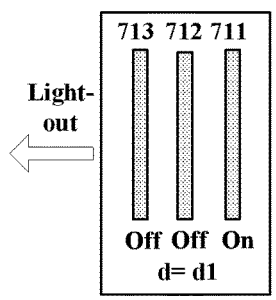 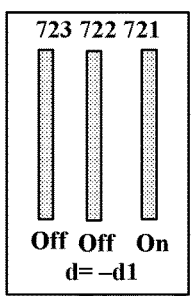
FIG. 7F    FIG. 7G
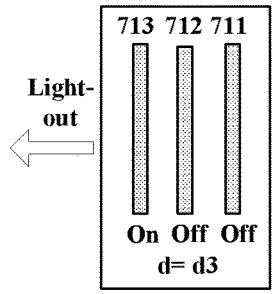 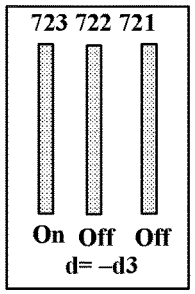
FIG. 7H

MULTIFOCAL SYSTEM USING ADAPTIVE LENSES

CROSS-REFERENCE TO RELATED APPLICATIONS

This application is a continuation of U.S. patent application Ser. No. 17/022,085, entitled "MULTIFOCAL SYSTEM USING ADAPTIVE LENSES," filed on Sep. 16, 2020, which is a continuation of U.S. patent application Ser. No. 16/265,435, filed on Feb. 1, 2019, which claims the benefit of priority to U.S. Provisional Patent Application No. 62/754,414, filed on Nov. 1, 2018. Contents of the above-mentioned applications are incorporated herein by reference in their entirety.

BACKGROUND

Virtual reality (VR) headsets can be used to simulate virtual environments. For example, stereoscopic images can be displayed on an electronic display inside a headset to simulate the illusion of depth, and head tracking sensors can be used to estimate what portion of the virtual environment is being viewed by the user. However, because existing headsets are often unable to correctly render or otherwise compensate for vergence and accommodation conflicts, such simulation can cause visual fatigue and nausea of the users. Augmented Reality (AR) headsets display a virtual image overlapping with real-world images. To create comfortable viewing experience, the virtual image generated by the AR headsets needs to be displayed at the right distance for the eye accommodations of the real-world images in real time during the viewing process.

SUMMARY OF THE DISCLOSURE

One aspect of the present disclosure provides a device. The device includes a first lens assembly controllable to switch between a first plurality of optical powers. The first lens assembly includes a plurality of directly optically coupled lenses, and is configured to converge or diverge a light transmitted therethrough. The device also includes a second lens assembly coupled with the first lens assembly, and controllable to switch between a second plurality of optical powers that are opposite to the first plurality of optical powers.

Another aspect of the present disclosure provides a method. The method includes receiving a first light by a first lens assembly controllable to switch between a first plurality of optical powers, the first lens assembly including a plurality of directly optically coupled lenses. The method further includes converging or diverging the first light, by the first lens assembly, while transmitting the first light to a second lens assembly controllable to switch between a second plurality of optical powers that are opposite to the first plurality of optical powers.

Other aspects of the present disclosure can be understood by those skilled in the art in light of the description, the claims, and the drawings of the present disclosure.

BRIEF DESCRIPTION OF THE DRAWINGS

The following drawings are provided for illustrative purposes according to various disclosed embodiments and are not intended to limit the scope of the present disclosure.

DETAILED DESCRIPTION

A multifocal system includes a head-mounted display (HMD). The HMD includes a multifocal block. The HMD presents content via an electronic display to a wearing user at a focal distance. The multifocal block adjusts the focal distance in accordance with instructions from the HMD to, e.g., mitigate vergence accommodation conflict of eyes of the wearing user. The focal distance is adjusted by adjusting an optical power associated with the multifocal block, and specifically by adjusting the optical power associated with one or more multifocal structures within the multifocal block.

In some embodiments, a virtual object is presented on the electronic display of the HMD that is part of the multifocal system. The light emitted by the HMD is configured to have a particular focal distance, such that the virtual scene appears to a user at a particular image plane. As the content to be rendered moves closer/farther from the user, the HMD correspondingly instructs the multifocal block to adjust the focal distance to mitigate a possibility of a user experiencing a conflict with eye vergence and eye accommodation. Additionally, in some embodiments, the HMD may track a user's eyes such that the multifocal system is able to approximate gaze lines and determine a gaze point including a vergence distance (an estimated point of intersection of the gaze lines) to determine an appropriate amount of accommodation to provide the user. The gaze point identifies an object or plane of focus for a particular frame of the virtual scene and the HMD adjusts the distance of the multifocal block to keep the user's eye in a zone of comfort as vergence and accommodation change.

Vergence-accommodation conflict is a problem in many virtual reality systems. Vergence is the simultaneous movement or rotation of both eyes in opposite directions to obtain or maintain single binocular vision and is connected to accommodation of the eye. Under normal conditions, when human eyes look at a new object at a distance different from an object they had been looking at, the eyes automatically change focus (by changing their shape) to provide accommodation at the new distance or vergence distance of the new object.

Figure 1A:
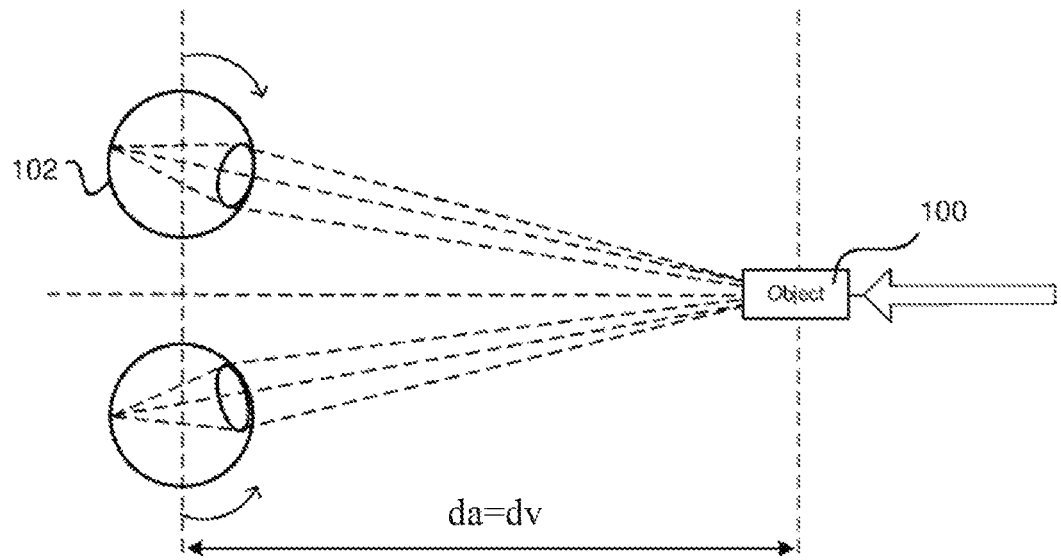
FIG. 1A illustrates the relationship between vergence and accommodation in the real word of the present disclosure.

FIG. 1A shows an exemplary of how the human eye experiences vergence and accommodation in the real world. As shown in FIG. 1A, the user is looking at a real object 100 (i.e., the user's eyes are verged on the real object 100 and gaze lines from the user's eyes intersect at real object 100). As the real object 100 is moved closer to the user, as indicated by the arrow in FIG. 1A, each eye 102 rotates inward (i.e., convergence) to stay verged on the real object 100. As the real object 100 gets closer, the eye 102 must "accommodate" for the closer distance by changing its shape to reduce the power or focal length. The distance to which the eye must be focused to create a sharp retinal image is the accommodative distance. Thus, under normal conditions in the real world, the vergence distance (dv) is equal to the accommodative distance (da).

Figure 1B:
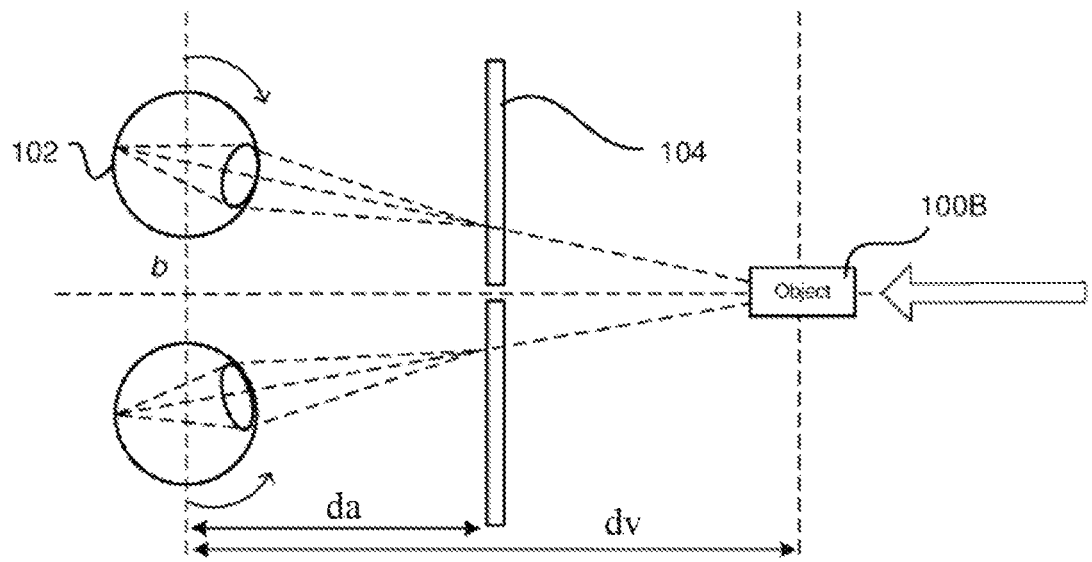
FIG. 1B illustrates the conflict between vergence and accommodation in a three-dimensional (3D) display screen of the present disclosure.

FIG. 1B shows an exemplary conflict between vergence and accommodation that can occur with some three-dimensional displays. As shown in FIG. 1B, a user is looking at a virtual object 100B displayed on an electronic screen 104. However, the user's eyes are verged on and gaze lines from the user's eyes intersect at virtual object 100B, which is at greater distance from the user's eyes than the electronic screen 104. As the virtual object 100B is rendered on the electronic display 104 to appear closer to the user, each eye 102 again rotates inward to stay verged on the virtual object 100B, but the power or focal length of each eye is not reduced; hence, the user's eyes do not accommodate as in FIG. 1A. Thus, instead of reducing power or increasing focal length to accommodate for the more distant vergence distance, each eye 102 maintains accommodation at a distance associated with the electronic display 104. Thus, the vergence distance (dv) often is not equal to the accommodative distance (da) for the human eye for objects displayed on 3D electronic displays. This discrepancy between vergence distance and accommodative distance is referred to as a "vergence-accommodation conflict." A user who is experiencing only vergence or accommodation but not both will eventually experience some degree of fatigue and nausea, which is undesirable for virtual reality system creators.

Figure 2A:
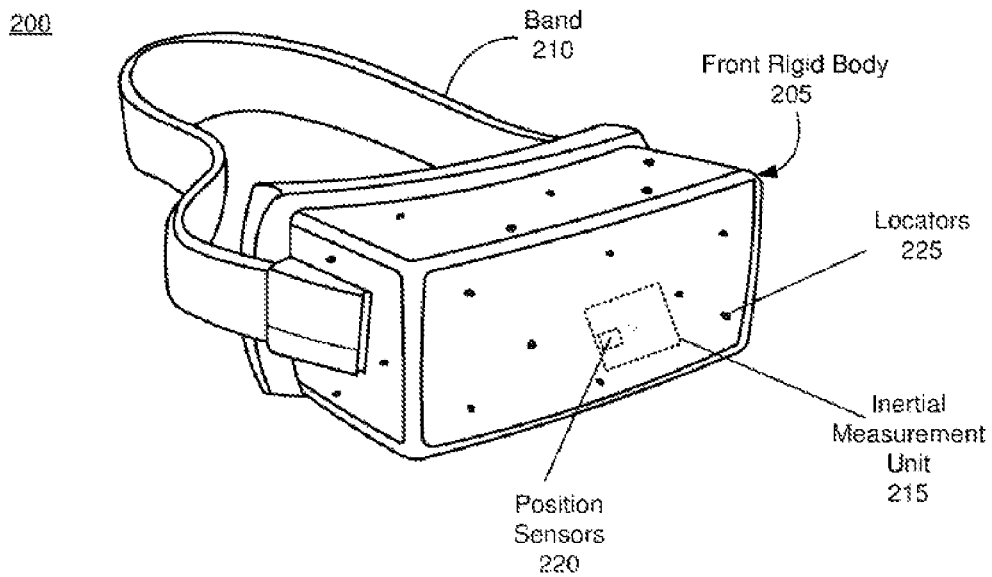
FIG. 2A illustrates a wire diagram of an exemplary head-mounted display (HMD) consistent with the disclosed embodiments.

FIG. 2A illustrates a wire diagram of an exemplary head-mounted display (HMD) 200 consistent with the disclosed embodiments. As shown in FIG. 2A, the HMD 200 may include a front rigid body 205 and a band 210. The front rigid body 205 may include one or more electronic display elements of an electronic display (not shown), an inertial measurement unit (IMU) 215, one or more position sensors 220, and locators 225. In the embodiment shown by FIG. 2A, the position sensors 220 may be located within the IMU 215, and neither the IMU 215 nor the position sensors 220 may be visible to the user. The IMU 215, the position sensors 220, and the locators 225 may be discussed in detail below with regard to FIG. 7. The HMD 200 acts as a virtual reality (VR) device, an augmented reality (AR) device or a mixed reality (MR) device, or some combination thereof. In some embodiments, when the HMD 200 acts as an augmented reality (AR) or a mixed reality (MR) device, portions of the HMD 200 and its internal components may be at least partially transparent.

Figure 2B:
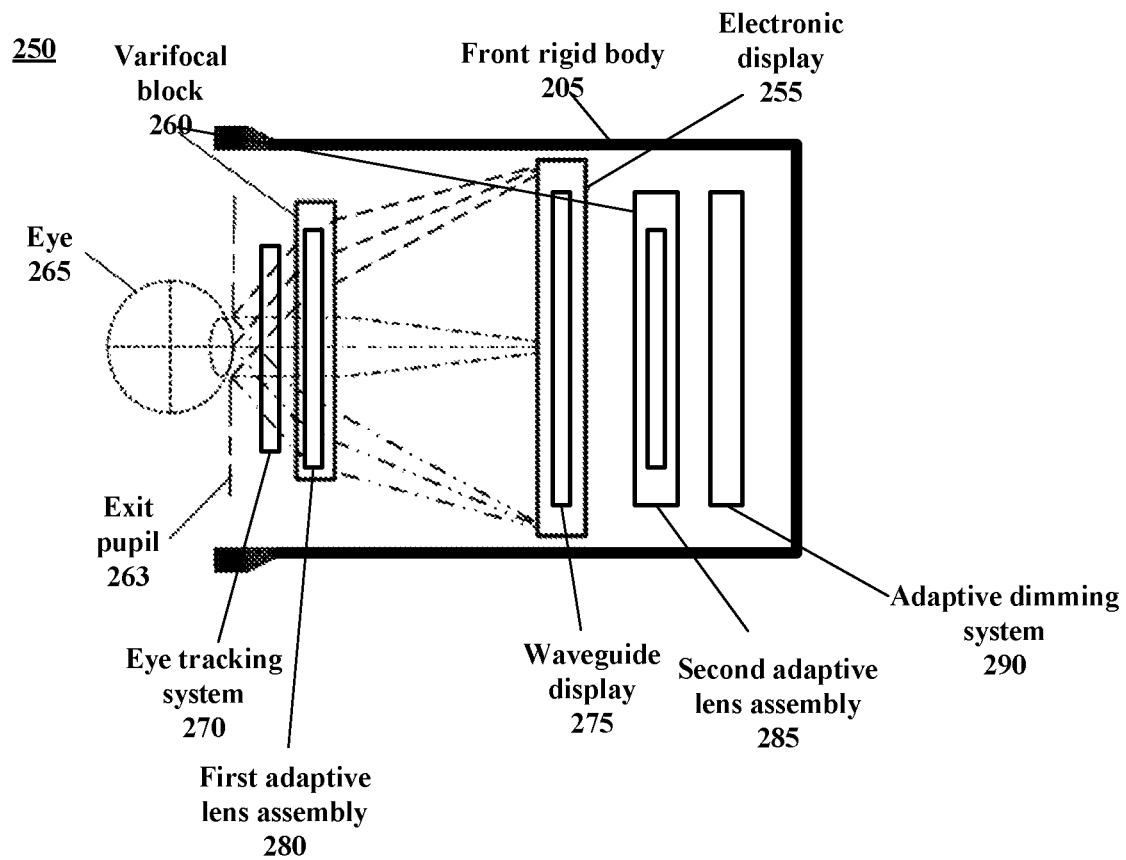
FIG. 2B illustrates a cross-section of a front rigid body of the head-mounted display in FIG. 2A consistent with the disclosed embodiments.

FIG. 2B is a cross section 250 of the front rigid body 205 of the embodiment of the HMD 200 shown in FIG. 2A. As shown in FIG. 2B, the front rigid body 205 may include an electronic display 255 and a multifocal block 260 that together provide image light to an exit pupil 263. The exit pupil 263 may be the location of the front rigid body 205 where a user's eye 265 is positioned. For purposes of illustration, FIG. 2B shows a cross section 250 associated with a single eye 265, but another multifocal block 260, which is separated from the multifocal block 260, may provide altered image light to another eye of the user.

Additionally, the HMD 200 may include an eye tracking system 270. The eye tracking system 270 may include, e.g., one or more sources that illuminate one or both eyes of the user, and one or more cameras that captures images of one or both eyes of the user. The HMD 200 may include an adaptive dimming system 290, which includes a dimming element. The dimming element may dynamically adjust the transmittance of the real-world objects viewed through the HMD 280, thereby switching the HMD 200 between a VR device and an AR device or between a VR device and a MR device. In some embodiments, along with switching between the AR/MR device and the VR device, the dimming element may be used in the AR device to mitigate difference in brightness of real and virtual objects.

The electronic display 255 may display images to the user. In various embodiments, the electronic display 255 may comprise a single electronic display or multiple electronic displays (e.g., a display for each eye of a user). Examples of the electronic display 255 include: a liquid crystal display (LCD), an organic light-emitting diode (OLED) display, an active-matrix organic light-emitting diode display (AMOLED), a quantum dot organic light-emitting diode (QOLED), a quantum dot light-emitting diode (QLED), some other display, or some combination thereof.

In some embodiments, the electronic display 255 may include a stack of one or more waveguide displays 275 including, but not limited to, a stacked waveguide display. In some embodiments, the stacked waveguide display may be a polychromatic display (e.g., a red-green-blue (RGB) display) created by stacking waveguide displays whose image light is from respective monochromatic sources of different colors. In some embodiments, the stacked waveguide display may be a monochromatic display.

Figure 2C:
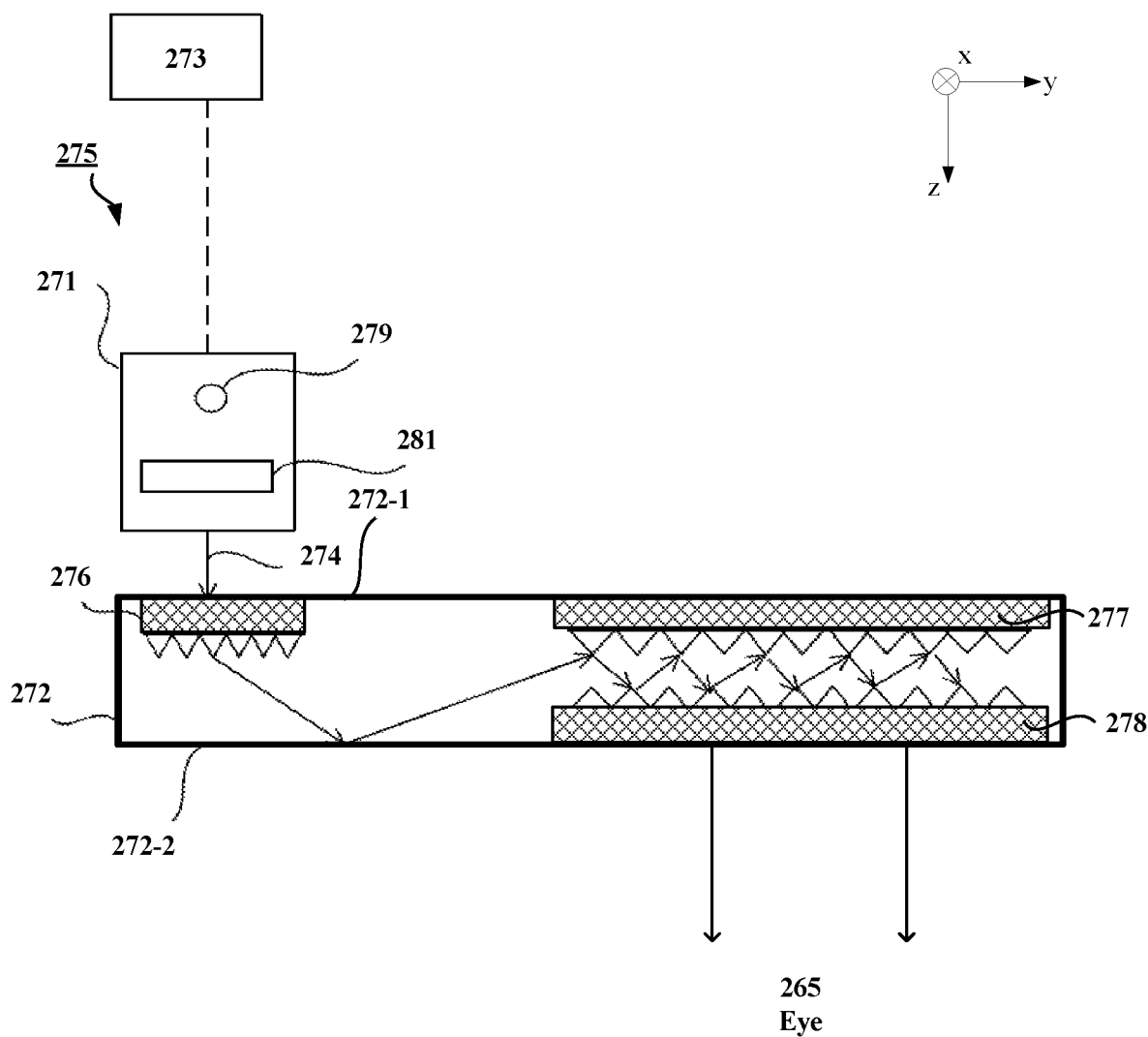
FIG. 2C illustrates a cross-section of an exemplary waveguide display of the head-mounted display in FIG. 2A consistent with the disclosed embodiments.

FIG. 2C is a cross section of a waveguide display 275 of the head-mounted display in FIG. 2A consistent with the disclosed embodiments. As shown in FIG. 2C, the waveguide display 275 may include a source assembly 271, an output waveguide 272, and a source controller 273. The source assembly 271 includes a source 279 and an optics system 281. The source 279 may be a light source that generates coherent or partially coherent light. The source 279 may include, e.g., a laser diode, a vertical cavity surface emitting laser, and/or a light emitting diode. The optics system 281 may include one or more optical components that condition the light from the source 279. Conditioning light from the source 279 may include, e.g., expanding, collimating, and/or adjusting orientation in accordance with instructions from the source controller 273.

The source assembly 271 may generate image light 274 and output the image light 274 to a coupling element 276 located on a first side 272-1 of the output waveguide 272. The output waveguide 272 may include an optical waveguide that outputs expanded image light 274 to the eye 265 of the user. The output waveguide 272 may receive the image light 274 at one or more coupling elements 276 located on the first side 272-1, and guide received image light 274 to a directing element 277. In some embodiments, the coupling element 276 may couple the image light 274 from the source assembly 271 into the output waveguide 272.

The coupling element 276 may include, for example, a diffraction grating, a holographic grating, one or more cascaded reflectors, one or more prismatic surface elements, and/or an array of holographic reflectors. In some embodiments, the coupling element 276 may be a diffraction grating, and a pitch of the diffraction grating may be chosen such that total internal reflection occurs in the output waveguide 282, and the image light 274 may propagate internally in the output waveguide 272 (e.g., by total internal reflection), toward a decoupling element 278.

The directing element 277 may redirect the received input image light 274 to the decoupling element 278, such that the received input image light 274 is decoupled out of the output waveguide 272 via the decoupling element 278. The directing element 277 may be part of, or affixed to, the first side 272-1 of the output waveguide 272. The decoupling element 278 may be part of, or affixed to, the second side 272-2 of the output waveguide 272, such that the directing element 277 is opposed to the decoupling element 278.

In some embodiments, the directing element 277 and/or the decoupling element 278 may be structurally similar. The directing element 277 and/or the decoupling element 278 may be, e.g., a diffraction grating, a holographic grating, one or more cascaded reflectors, one or more prismatic surface elements, and/or an array of holographic reflectors. In some embodiments, the directing element 277 may be a diffraction grating, the pitch of the diffraction grating is chosen to cause incident image light 274 to exit the output waveguide 272 at angle(s) of inclination relative to a surface of the decoupling element 278.

The output waveguide 272 may be composed of one or more materials that facilitate total internal reflection of the image light 274. The output waveguide 272 may be composed of, for example, silicon, plastic, glass, and/or polymers. The output waveguide 272 may have a relatively small form factor. For example, the output waveguide 272 may be approximately 50 mm wide along the x-dimension, 30 mm long along the y-dimension and 0.5-1 mm thick along the z-dimension.

The source controller 273 may control scanning operations of the source assembly 271, and determine scanning instructions for the source assembly 271. In some embodiments, the output waveguide 272 may output expanded image light 274 to the user's eye 265 with a large field of view (FOV). For example, the expanded image light 274 may be provided to the user's eye 265 with a diagonal FOV (in x and y) of 60 degrees and or greater and/or 150 degrees and/or less. The output waveguide 272 may be configured to provide an eye-box with a length of 20 mm or greater and/or equal to or less than 50 mm, and/or a width of 10 mm or greater and/or equal to or less than 50 mm.

In some embodiments, the waveguide display 275 may include a plurality of source assemblies 271 and a plurality of output waveguides 272. Each of the source assemblies 271 may emit a monochromatic image light of a specific wavelength band corresponding to a primary color (e.g., red, green, or blue). Each of the output waveguides 272 may be stacked together with a distance of separation to output an expanded image light 274 that is multi-colored. Using the waveguide display 275, the physical display and electronics may be moved to the side (near the user's temples) and a fully unobstructed view of the real world may be achieved, therefore opening up the possibilities to true AR experiences.

Figure 2D:
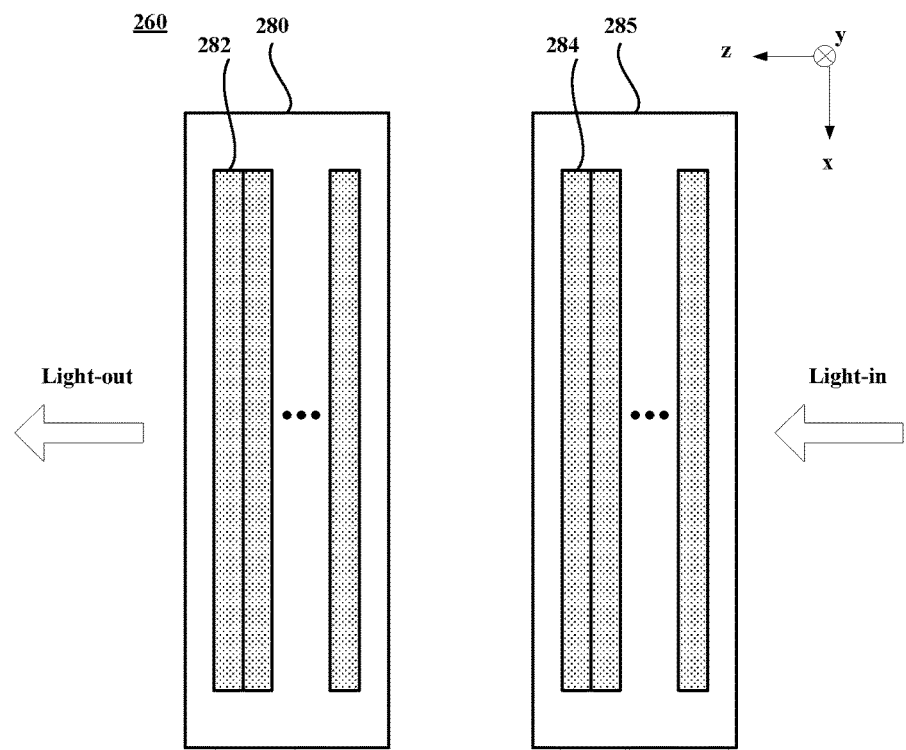
FIG. 2D illustrates a diagram of an exemplary multifocal block using adaptive lenses consistent with the disclosed embodiments.

FIG. 2D illustrates an exemplary multifocal block 260 using adaptive lenses consistent with the disclosed embodiments. As shown in FIG. 2B and FIG. 2D, the multifocal block 260 may include one or more multifocal structures in optical series. A multifocal structure is an optical device that is configured to dynamically adjust its focus in accordance with instructions from a multifocal system. Optical series refers to relative positioning of a plurality of optical elements, such that light, for each optical element of the plurality of optical elements, is transmitted by that optical element before being transmitted by another optical element of the plurality of optical elements. Moreover, ordering of the optical elements does not matter. For example, optical element A placed before optical element B, or optical element B placed before optical element A, are both in optical series. Similar to electric circuitry design, optical series represents optical elements with their optical properties compounded when placed in series.

The multifocal block 260 may comprise a first adaptive lens assembly 280 which adjusts a focal distance/an image plane at which images from the electronic display 255 are presented to a user of the HMD. The first adaptive lens assembly 280 may include a plurality of lenses 282 arranged in optical series, at least one of which is an active lens having a plurality of optical states (i.e., focal states), such that the plurality of lenses 282 provides a plurality of combinations of optical power, and the plurality of combinations of optical power provides a range of adjustment of optical power for the multifocal block 260. The range of adjustment of optical power for the multifocal block 260 may be a set of discrete values of optical power, and a minimum number of the discrete values of optical power is two. That is, the multifocal block 260 may generate multiple (at least two) image planes.

In some embodiments, the active lens may be an active or switchable liquid crystal (LC) lens that is switchable between a lens switched-on state with non-zero optical power of d and a lens switched-off state with zero optical power. Herein the unit of the optical power is Diopter. It should be noted that, depending on different structures of the active LC lenses, the active LC lens may provide optical power of d with an applied voltage and optical power of zero without an applied voltage, or vice versa. The active LC lens may be polarization dependent (e.g., linear or circular polarization dependent) or polarization independent. For example, the active LC lens may be one of a linear polarization dependent active LC lens, a circular polarization dependent active LC lens, and a polarization independent active LC lens.

In some embodiments, the first adaptive lens assembly 280 may also include at least one passive lens having non-switchable optical power, i.e., fixed optical power. In some embodiments, the passive lens may be conventional lens made of, for example, glass, plastic or polymer. In some embodiments, the passive lens may be a polarization dependent or a polarization independent LC lens.

The minimum number of the discrete values of optical power or the optical power combinations provided by the first adaptive lens assembly 280 may be two, which may be achieved by using one active lens and one passive lens. The maximum number of the discrete values of optical power or optical power combinations provided by the first adaptive lens assembly 280 may be unlimited, without considering size or other optical property factors. When the number of the optical power provided by the first adaptive lens assembly 280 increases, the performance of the first adaptive lens assembly 280 may gradually approach that of a varifocal lens. That is, the size of the range of adjustment for the multifocal block 260 may scale with the number of active lenses included in the first adaptive lens assembly 280.

In some embodiments, to provide a series of optical power, the linear polarization dependent active LC lens may be arranged in optical series with other linear polarization dependent active LC lenses and/or passive lenses (such as conventional lenses, linear polarization dependent passive LC lenses, or polarization independent passive LC lenses), and the incident light may be linearly polarized. The circular polarization dependent active LC lens may be arranged in optical series with other circular polarization dependent active LC lenses and/or passive lenses (such as conventional lenses, circular polarization dependent passive LC lenses, or polarization independent passive LC lenses), and the incident light may be circularly polarized. The polarization independent active LC lenses may be arranged in optical series other active and/or passive polarization independent lenses (such as conventional lenses or polarization independent LC passive lenses).

In some embodiments, when the HMD acts as an AR or an MR device, the multifocal block 260 may further include a second adaptive lens assembly 285 configured to compensate the distortion of the real-world images caused by the first adaptive lens assembly 280, such that the real-world objects viewed through the HMD may stay unaltered. The second adaptive lens assembly 285 may provide a plurality of combinations of optical power, which is opposite to the plurality of combinations of optical power but having a same absolute value as the plurality of combinations of optical power provided by the first adaptive lens assembly 280.

In some embodiments, the first adaptive lens assembly 280 may be configured to provide positive optical power and, thus, the second adaptive lens assembly 285 may be configured to negative optical power of the same magnitude to compensate the first adaptive lens assembly 280. When the HMD acts as a VR device, the second adaptive lens assembly 285 may be omitted.

Similar to the first adaptive lens assembly 280, the second adaptive lens assembly 285 may also include a plurality of lenses 284 arranged in optical series, and at least one of the plurality of lenses 284 may be an active lens having a plurality of optical states. The second adaptive lens assembly 285 may provide a series of optical power which are formed by various combinations of optical power of the plurality of lenses, which in turn are achieved by the plurality of optical states of the active lens. The second adaptive lens assembly 285 may include the same number of lenses as the first adaptive lens assembly.

In some embodiments, the active lens included in the second adaptive lens assembly 285 may be an active LC lens having switchable optical power, whose features may be similar to that of the active LC lens in the first adaptive lens assembly 280. Further, the plurality of lenses 284 in the second adaptive lens assembly 285 may have the same polarization dependency as the plurality of lenses 282 in the first adaptive lens assembly 280. For example, the active LC lenses in the first adaptive lens assembly 280 and the second adaptive lens assembly 285 may be both linear polarization dependent active LC lenses, circular polarization dependent active LC lenses, or polarization independent active LC lenses. In some embodiments, the second adaptive lens assembly 285 may also include at least one passive lens with unswitchable optical power, whose features may be similar to that of the passive lens in the first adaptive lens assembly 280. The passive lens in the second adaptive lens assembly 285 may have the same lens type or polarization dependency as the passive lens in the first adaptive lens assembly 280. The details of the active LC lens and the passive lens included in the second adaptive lens assembly 285 are not repeated here.

Further, the multifocal block 260 may include one or more substrate layers, a linear polarizer, a quarter-wave plate, a half-wave plate, a circular polarizer or some combination thereof. For example, the linear polarizer may be optically coupled to the first adaptive lens assembly, to ensure the light incident onto the first adaptive lens assembly is linearly polarized light. The linear polarizer and the quarter-wave plate may be optically coupled to the first adaptive lens assembly, to ensure the light incident onto the first adaptive lens assembly is circularly polarized light. The half-wave plate may switch the polarization direction of incident polarized light to the orthogonal one. For example, the half-wave plate may reverse the handedness of the incident circularly polarized light. In some embodiments, the half-wave plate may include a switchable half-wave plate (SHWP), which may reverse the handedness of the incident circularly polarized light in accordance with a switching state (i.e., active or non-active). The circular polarizer and the quarter-wave plate may be optically coupled to the first adaptive lens assembly, to ensure the light incident onto the first adaptive lens assembly is linear polarized light. In some embodiments, the circular polarizer may include a cholesteric circular polarizer.

The substrate layers are layers which other elements (e.g., switchable half-wave plate, liquid crystal, etc.) may be formed upon, coupled to, etc. The substrate layers are substantially transparent in the visible band (~380 nm to 750 nm). In some embodiments, the substrate may also be transparent in some or all of the infrared (IR) band (~750 nm to 1 mm). The substrate layers may be composed of, e.g., $SiO_2$, plastic, sapphire, etc.

Additionally, in some embodiments, the multifocal block 260 may magnify received light, corrects optical errors associated with the image light, and presents the corrected image light is presented to a user of the HMD 200. The multifocal block 260 may additionally include one or more optical elements in optical series. An optical element may be an aperture, a Fresnel lens, a convex lens, a concave lens, a filter, or any other suitable optical element that affects the blurred image light. Moreover, the multifocal block 260 may include combinations of different optical elements. In some embodiments, one or more of the optical elements in the multifocal block 260 may have one or more coatings, such as anti-reflective coatings.

Figure 3A:
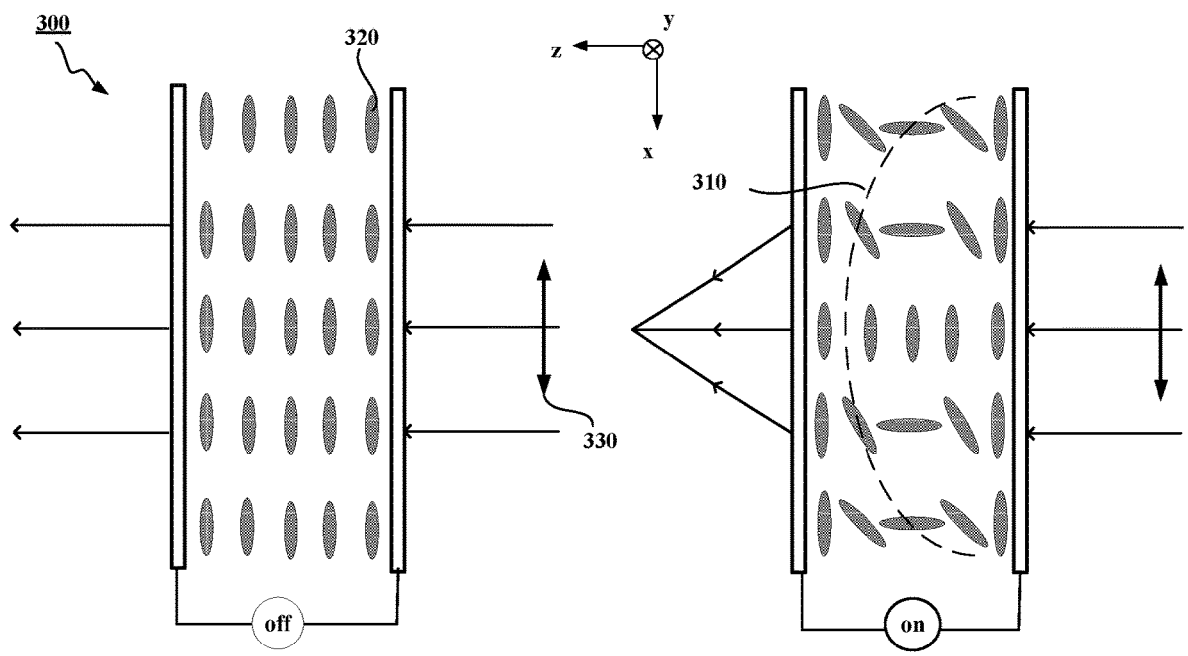
FIGS. 3A-3B illustrate an exemplary linear polarization dependent liquid crystal (LC) lens consistent with the disclosed embodiments.
Figure 3B:
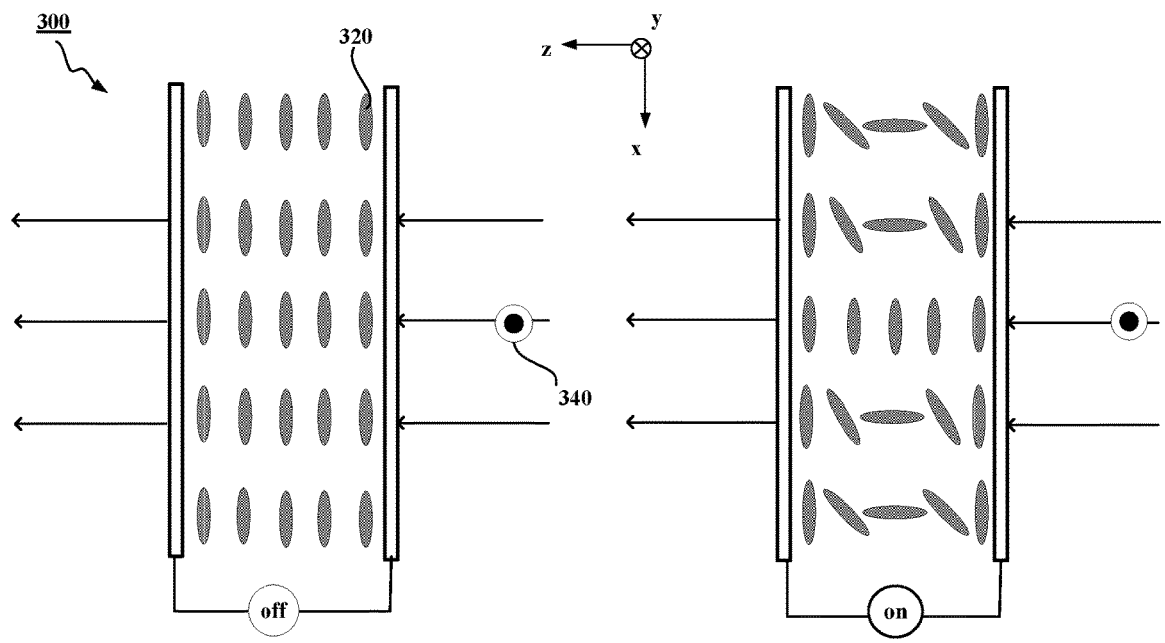

FIGS. 3A-3B illustrate an exemplary linear polarization dependent LC lens 300 consistent with the disclosed embodiments. As shown in FIGS. 3A-3B, the linear polarization dependent LC lens 300 is often named as a GRIN (Gradient of Refractive Index) lens, which is a lens with gradient of refractive index. The gradient of refractive index may be obtained by gradient of LC alignment. In some embodiments, the gradient of LC alignment may be obtained by gradient of electric field generated in the LC lens 300, which may be realized by adopting, for example, a set of discrete ring-patterned electrodes addressed individually with different voltages, a hole-patterned electrode plate, or a spherical shape electrode. In some embodiments, the gradient of LC alignment may be obtained by gradient of anchoring which determines gradient of LC pretilt angles.

In one embodiment, as shown in FIG. 3A, when applying a zero voltage (or more generally below some minimal value which is too small to reorient LC molecules 230) to the LC lens 300, the LC molecules 320 may be uniformly aligned along an x-direction in an LC layer. For incident light 330 having a polarization direction along the alignment directions of the LC molecules 320 or the LC layer, i.e., x-direction, the optical power of the LC lens 300 may be zero. That is, no lens effect is provided.

When applying a voltage of certain amplitude (or more generally above some threshold value which is large enough to reorient the LC molecules 320) to the LC lens 300, the LC molecules 320 may be reoriented to generate the gradient of LC alignment from the center to the edge of the LC layer. In one embodiment, as shown in FIG. 3A, from the center to the edge of the LC layer, the LC alignment may change from being parallel to a surface of the LC lens 300 to being closer to perpendicular to the surface of the LC lens 300. For the incident light 330 having the polarization direction along the alignment directions of the LC molecules 320 or the LC layer, i.e., x-direction, the effective refractive index of the LC molecules 320 may gradually decrease from the center to the edge of the LC layer. Then a positive lens profile 310 may be obtained, and the incident light having the polarization direction 330 along the x-direction may be focused. That is, the LC lens 330 may be a positive LC lens providing positive optical power d.

In particular, the optical power d of the switched-on LC lens 300 may be calculated by $d=8\delta n*L/D2$, where L is the thickness of the LC layer, D is the aperture size of the LC lens 300, $\delta n$ is the refractive indices difference between the center and the edge of the LC lens 300. As long as the aperture size (D) and the thickness (L) are fixed, the optical power d of the LC lens 300 may be determined by the refractive indices difference ($\delta n$) between the center and the edge. $\delta n$ is always smaller than or equal to $\Delta n$, where $\Delta n$ is the birefringence of the LC materials of the LC layer.

As shown in FIG. 3B, for the incident light 340 having the polarization direction perpendicular to the alignment directions of the LC molecules 320 or the LC layer, i.e., y-direction, the LC lens 300 may appear to be a transparent plate without gradient of refractive index regardless of the applied voltage. That is, the LC lens 300 may not provide a lens effect to the incident light 340 polarized in y-direction.

It should be noted that, the LC molecules orientations shown in FIGS. 3A-3B are merely for illustrative purposes and are not intended to limit the scope of the present disclosure. The LC lens 300 may have any appropriate structure which utilize the change in polar angle (or tilt angle) to create the lens profile, and the optical power of the LC lens 300 could be switched between some value d (e.g., at the lens switched-on state) and 0 (e.g., at the lens switched-off state), such as a Fresnel LC lens based on light diffraction. In some embodiments, the LC lens 300 may be a negative lens providing negative optical power. In some embodiments, the LC lens 300 may be a hybrid lens, whose optical power could be changed from a certain negative value to zero to a certain positive value.

Figure 4A:
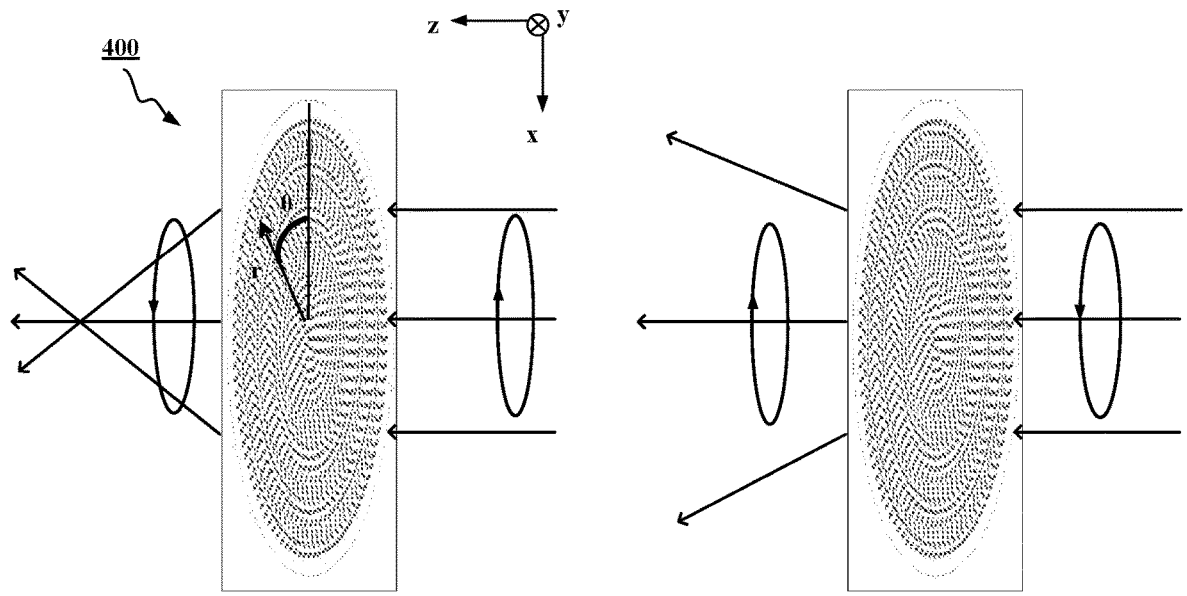
FIG. 4A illustrates an exemplary circular polarization dependent LC lens consistent with the disclosed embodiments.

FIG. 4A illustrates an exemplary circular polarization dependent LC lens 400 consistent with the disclosed embodiments. In some embodiments, the circular polarization dependent LC lens 400 may be a Pancharatnam Berry Phase (PBP) LC lens, which creates a lens profile via an in-plane orientation ($\theta$, azimuth angle) of LC molecules. The phase difference of the PBP LC lens may be calculated as $T=2\theta$.

Figure 4B:
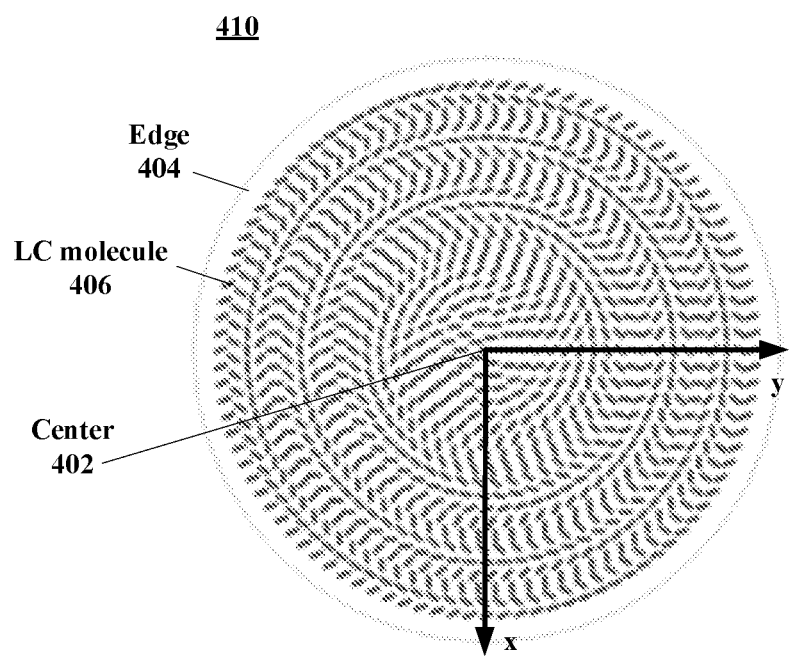
FIG. 4B illustrates exemplary LC orientations in the LC lens of FIG. 4A consistent with the disclosed embodiments.
Figure 4C:
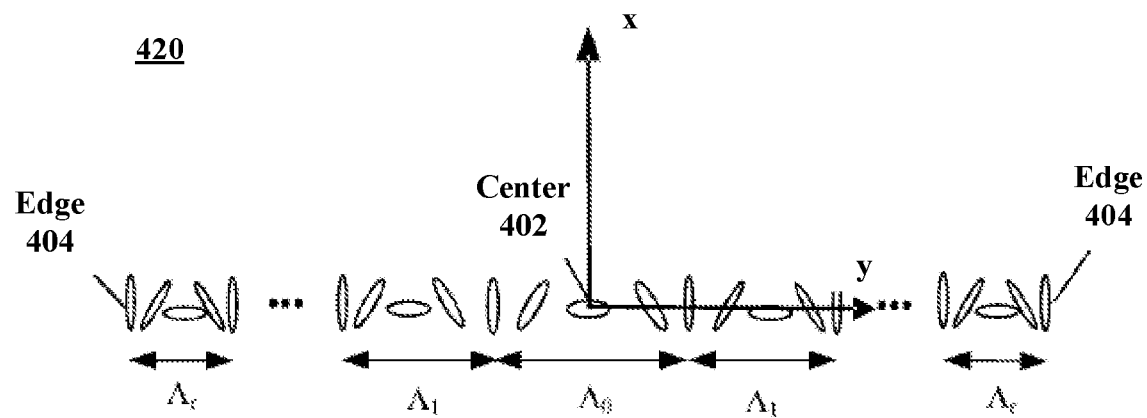
FIG. 4C illustrates a section of exemplary LC orientations taken along y-axis in the LC lens of FIG. 4A consistent with the disclosed embodiments.

FIG. 4B illustrates exemplary LC orientations 410 in the LC lens of FIG. 4A. As shown in FIG. 4B, in the PBP LC lens 400, an azimuth angle (θ) of an LC molecule 406 may be continuously changed from a center 402 to an edge 404 of the PBP LC lens 400, with a varied pitch $\Lambda$. Pitch is defined in a way that the azimuth angle of LC is rotated 180° from the initial state. FIG. 4C illustrates a section of exemplary LC orientations 420 taken along y-axis in the LC lens of FIG. 4A. As shown in FIG. 4C, a rate of pitch variation may be a function of distance from the lens center 402. The rate of pitch variation may increase with distance from the lens center. For example, the pitch at the lens center 402 ($\Lambda 0$) may be the highest or the pitch variation is the slowest, and the pitch at the edge 404 ($\Lambda r$) may be the smallest or the pitch variation is the fastest, i.e., $\Lambda 0 > \Lambda 1 > \ldots > \Lambda r$.

Referring to FIGS. 4A-4C, in the x-y plane, to obtain a PBP LC lens with lens radius (r) and lens power (+/−f), the azimuth angle $\theta$ may satisfy: $2\theta = er2/(f*\lambda)$, where $\lambda$, is the wavelength of incident light. In addition, along the light propagation direction z-direction, a dual twist or multiple twisted structure layers offers achromatic performance on efficiency in the PBP LC lens 400. Along the z-direction, the non-twisted structure is simpler to fabricate then a twisted structure, but is optimized for a monochromatic light.

Design specifications for HMDs used for VR, AR, or MR applications typically requires a large range of optical power to adapt for human eye vergence-accommodation (e.g., ~±2 Diopters or more), fast switching speeds (e.g., <20 ms), and a good quality image. The PBP LC lens 400 may be able to meet design specs using LC materials having a relatively low index of refraction and, moreover, the PBP LC lens 400 may have a large aperture size, a thin thickness (e.g., a single LC layer can be ~2 μm) and high switching speeds (e.g., <20 ms) to turn the lens power on/off.

Returning to FIG. 4A, in some embodiments, the PBP LC lens 400 may be an active PBP LC lens, which has three discrete focal states (also referred to as optical states). The three optical states are an additive state, a neutral state, and a subtractive state. In particular, the additive state may add optical power to the system (i.e., have a positive focus of 'f'), and the subtractive state may subtract optical power from the system (i.e., have a negative focus of '−f'). When not in the neutral state, the PBP LC lens 400 may reverse the handedness of circularly polarized light passing through the PBP LC lens 400 in addition to focusing/defocusing the incident light. The neutral state may not affect the optical power of the system, however, the handedness of circularly polarized light passing through the PBP LC lens 400 may be unchanged or changed.

The optical state of the PBP LC lens 400 may be determined by the handedness of circularly polarized light incident on the PBP LC lens and an applied voltage. In some embodiments, as shown in FIG. 4A, the PBP LC lens 400 may operate in an additive state that adds optical power to the system in response to incident light with a right-handed circular polarization and an applied voltage of zero (or more generally below some minimal value), operate in a subtractive state that removes optical power from the system in response to incident light with a left-handed circular polarization and the applied voltage of zero (or more generally below some minimal value), and operate in a neutral state (regardless of polarization) that does not affect the optical power of the system in response to an applied voltage larger than a threshold voltage which aligns LCs along with the electric field.

Through flipping the PBP LC lens 400, the additive state and the subtractive state of the PBP LC lens 400 may be reversed for the circularly polarized incident light with the same handedness. For example, after flipping the PBP LC lens 400 in FIG. 4A, the flipped PBP LC lens (at the right side of FIG. 4A) may operate in an additive state that adds optical power to the system in response to incident light with a left-handed circular polarization and an applied voltage of zero (or more generally below some minimal value), operate in a subtractive state that removes optical power from the system in response to incident light with a right-handed circular polarization and the applied voltage of zero (or more generally below some minimal value), and operate in a neutral state (regardless of polarization) that does not affect the optical power of the system in response to an applied voltage larger than a threshold voltage which aligns LCs along with the electric field.

Figure 4D:
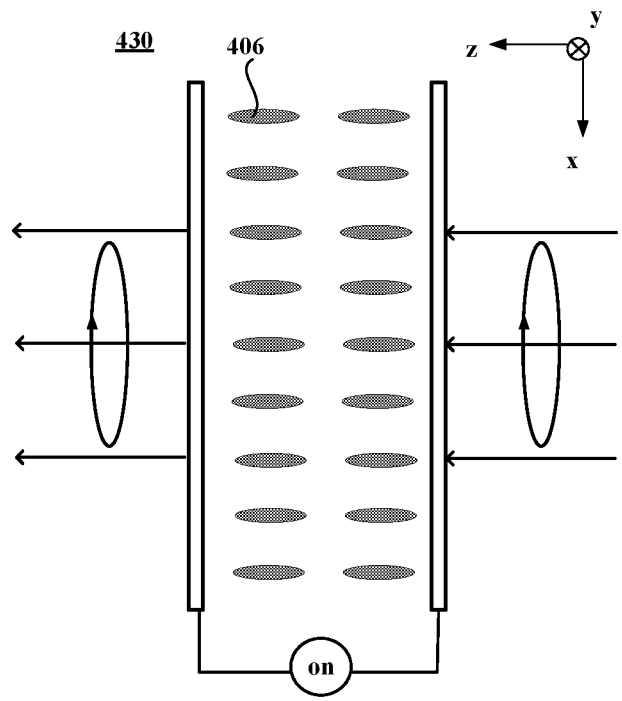
FIG. 4D illustrates an exemplary neutral state of the LC lens of FIG. 4A consistent with the disclosed embodiments.

Although the PBP LC lens 400 does not provide any lens power in the neutral state, the polarization handedness of the light transmitted through the PBP LC lens 400 may be changed or unchanged. FIG. 4D illustrates an exemplary neutral state 430 of the BPB LC lens 400 which does not change the polarization handedness of the transmitted light. As shown in FIG. 4D, when the generated electric field is perpendicular to the LC layer (e.g., a vertical electrical field which is applied across the LC layer), the LC molecules 406 having positive dielectric anisotropy may be reoriented along the direction of the vertical electrical field to be perpendicular to the LC layer, i.e., out-of-plane switched. That is, the orientation of the LC molecules 406 having positive dielectric anisotropy may be in a homeotropic state and, thus, the LC layer may act as isotropic medium for normally incident light. When the optical power of the BPB LC lens 400 is out-of-plane switched off, the polarization handedness of the light transmitted through the PBP LC lens 400 may not be affect.

Figure 4E:
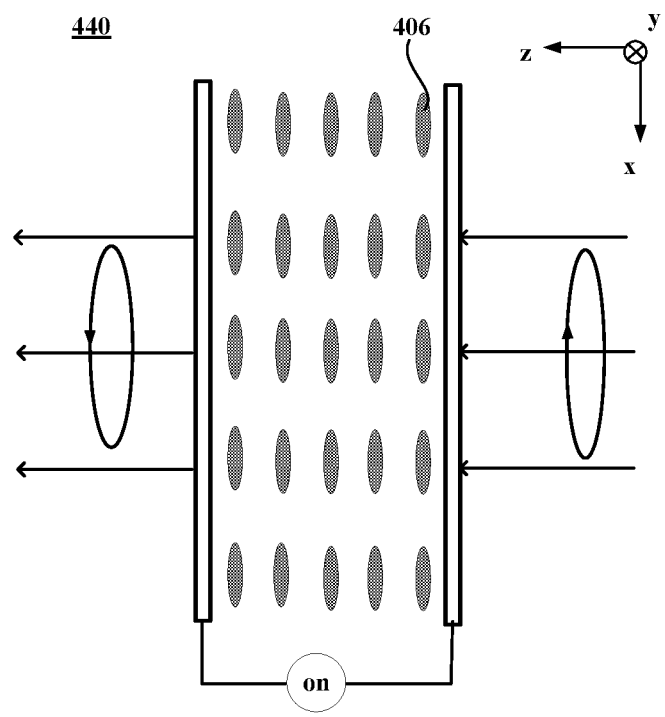
FIG. 4E illustrates another exemplary neutral state of the LC lens of FIG. 4A consistent with the disclosed embodiments.

FIG. 4E illustrates an exemplary neutral state 440 of the BPB LC lens 400 which reverses the polarization handedness of the transmitted light transmitted. As shown in FIG. 4E, when the generated electric field is parallel to the LC layer (e.g., a horizontal electric field which is applied in plane of the LC layer), the LC molecules 406 having positive dielectric anisotropy may be reoriented along the direction of the horizontal electrical field to be parallel to the LC layer, i.e., in-plane switched, and the orientation of the LC molecules 406 having positive dielectric anisotropy may be in a homogeneous state. That is, the patterned LC alignment structure giving optical power of the BPB LC lens 400 may be transformed to the uniform uniaxial planar structure functioning as a half-wave plate. When the optical power of the BPB LC lens 400 is in-plane switched off, for the circularly polarized incident light, the polarization handedness of the light transmitted through the PBP LC lens 400 may be reversed.

For illustrative purposes, FIGS. 4D-4E merely illustrate the orientation of the LC molecules 406 having positive dielectric anisotropy under a generated electric field. In some embodiments, the LC molecules may have negative dielectric anisotropy, then the generated vertical electric field may enable the LC molecules 406 to be reoriented towards a direction parallel to the LC layer, which leads to a reversed polarization handedness of the light transmitted through the PBP LC lens 400. The horizontal electric field may enable the LC molecules 406 to be reoriented towards a direction perpendicular to the LC layer, and the polarization handedness of the light transmitted through the PBP LC lens 400 may not be affected.

In some embodiments, the PBP LC lens 400 may also be a passive lens having two optical states: an additive state and a subtractive state. The state of the passive PBP LC lens 400 may be determined by the handedness of the circularly polarized incident light. In some embodiments, the passive PBP LC lens may operate in an additive state that adds optical power to the system in response to incident light with a right-handed circular polarization, and operate in a subtractive state that removes optical power from the system in response to incident light with a left-handed circular polarization.

Figure 5:
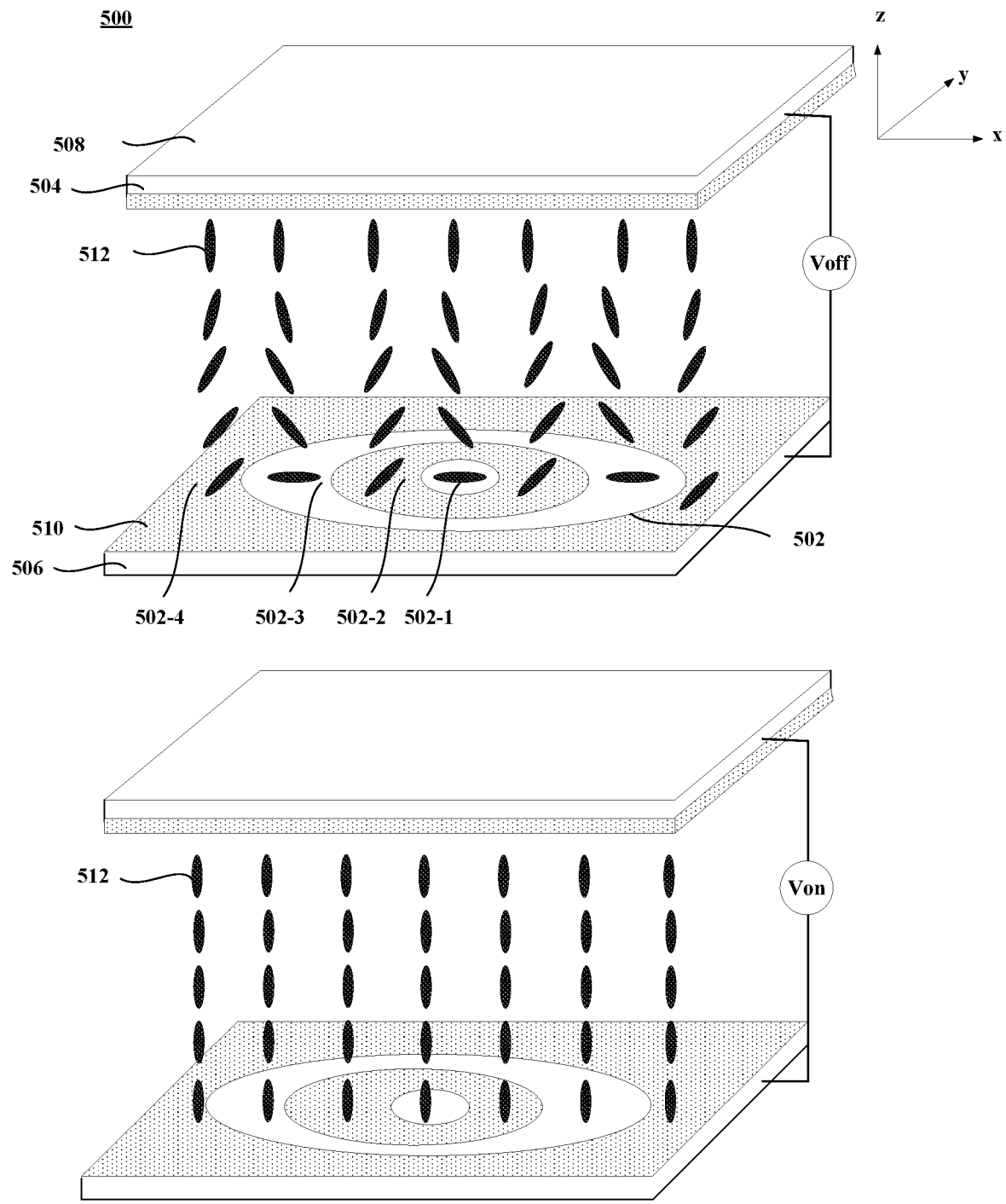
FIG. 5 illustrates an exemplary polarization independent LC lens consistent with the disclosed embodiments.

FIG. 5 illustrates an exemplary polarization independent LC lens 500 consistent with the disclosed embodiments. As shown in FIG. 5, the polarization independent LC lens 500 may be a Fresnel lens 500 which includes a plurality of zones 502 formed in LC layer sandwiched between a first transparent electrode 504 and a second transparent electrode 506. In particular, the Fresnel lens 500 may have orthogonally alternating hybrid alignment in neighboring zones 502. A first alignment layer 508 may be disposed on an inner surface of the first transparent electrode 504 to provide a homeotropic alignment of LC molecules 512, and a second alignment layer 510 may be disposed on an inner surface of the second transparent electrode 506 to provide a homogeneous alignment of the LC molecules 512.

Meanwhile, the second alignment layer 510 may provide orthogonal alignment directions to the LC molecules 512 in adjacent zones. For example, as shown in FIG. 5, from the center to the edge of the Fresnel lens 500, the second alignment layer 510 may provide an x-direction homogeneous alignment to the LC molecules 512 in the odd-number zones (e.g., 502-1, 502-3), while provide a y-direction homogeneous alignment to the LC molecules 512 in the even-number zones (e.g., 502-2, 502-4). The orthogonality between the optic axes in two adjacent zones 502 in an alternating hybrid configuration may lead directly to the polarization-insensitive characteristics of the Fresnel lens 500 regardless of the polarization state of the incident light.

When the Fresnel lens 500 is a binary-type Fresnel lens, without any applied voltage, the focal length f of the Fresnel lens is calculated by $f = R1^2/\lambda$, where $\lambda$ is the wavelength of the incident light, and R1 is the radius of the innermost zone. With a sufficient high applied voltage, the LC molecules 512 may be reoriented along the direction of the generated electric field to be aligned perpendicular to the surface of the Fresnel lens 500, and the lens effect may be erased.

Below various designs of multifocal structures are discussed. It is important to note that these designs are merely illustrative, and other designs of multifocal structures may be generated using the principles described herein. In some embodiments, the multifocal structures within the multifocal block may be designed to meet requirements for an HMD (e.g., the HMD). Design requirements may include, for example, large aperture size (e.g., 2.4 cm) for large field of view (e.g., FOV, —90 degrees with 20 mm eye relief distance), large optical power (e.g., ±2.0 Diopters) for adapting human eye vergence accommodation, and fast switching speed (<20 ms) for adapting human eye vergence-accommodation, and good image quality for meeting human eye acuity. In certain other embodiments, the multifocal structures may include other optical elements in optical series.

Figure 6A:
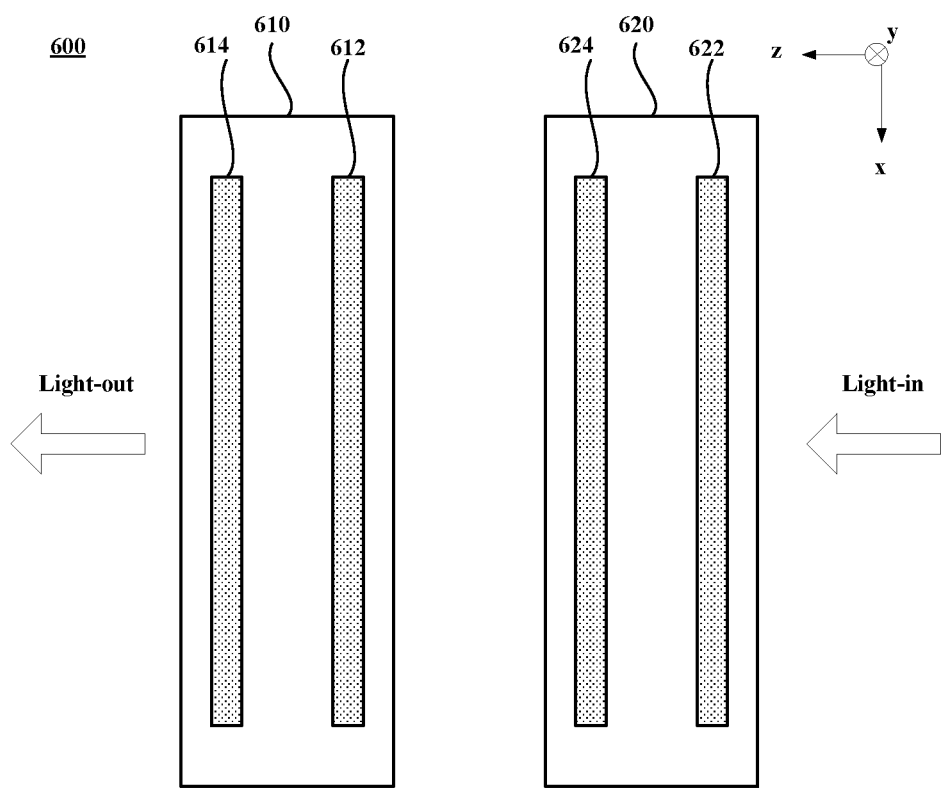
FIG. 6A illustrates an exemplary multifocal block consistent with the disclosed embodiments.

FIG. 6A illustrates an exemplary multifocal block 600 consistent with the disclosed embodiments. As shown in FIG. 6A, the multifocal block 600 may comprise a first adaptive lens assembly 610 configured to adjust a focal distance at which images from an electronic display are presented to a user of the HMD. The first adaptive lens assembly 610 may include a first lens 611 and a second lens 612 arranged in optical series. At least one of the first lens 611 and the second lens 612 may be an active LC lens that is switchable between a lens switched-on state with non-zero optical power and a lens switched-off state with zero optical power. Accordingly, the first adaptive lens assembly 610 may provide two or three discrete values of optical power for the multifocal block 600.

In some embodiments, for AR/MR HMD applications, the multifocal block 600 may further comprise a second adaptive lens assembly 620 which compensates the first adaptive lens assembly 610, such that real-world objects viewed through the HMD may stay unaltered. The second adaptive lens assembly 620 may include a first lens 621 and a second lens 622 arranged in optical series, and at least one of the first lens 621 and the second lens 622 may be an active LC lens that is switchable between a lens switched-on state with non-zero optical power and a lens switched-off state with zero optical power. Accordingly, the second adaptive lens assembly 620 may provide two or three discrete values of optical power, which is opposite to but having the same absolute value as the two or three discrete values of optical power provided by the first adaptive lens assembly 610.

Figure 6G:
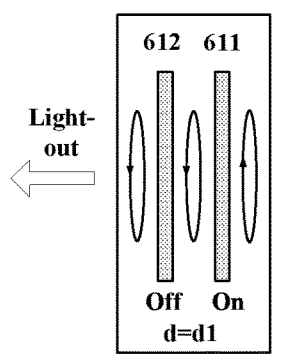
FIGS. 6B-6Q illustrate exemplary optical power adjustments of the multifocal block in FIG. 6A consistent with the disclosed embodiments.
Figure 6G:
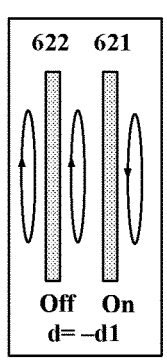
Figure 6H:
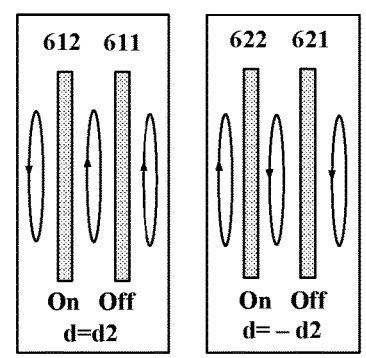
Figure 6I:
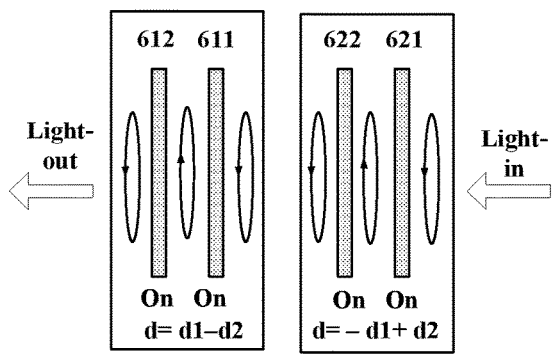
Figure 6J:
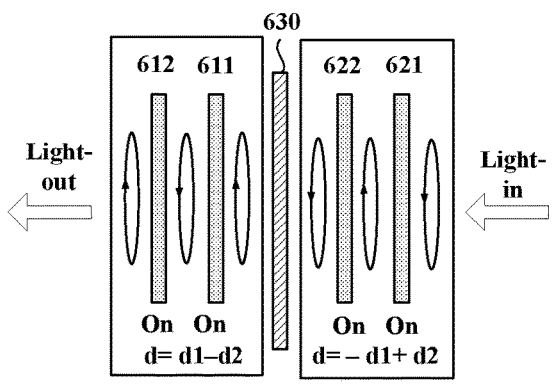
Figures 6K, 6L:
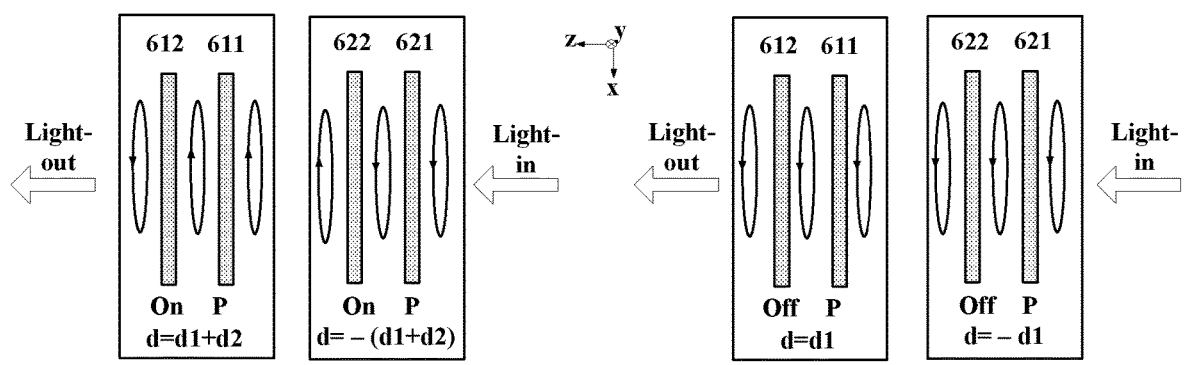
Figures 6M, 6N:
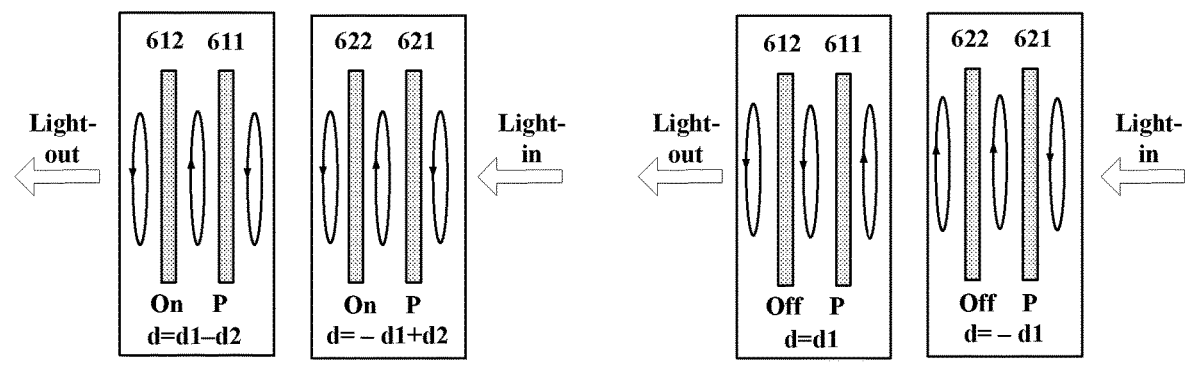
Figures 6O, 6P:
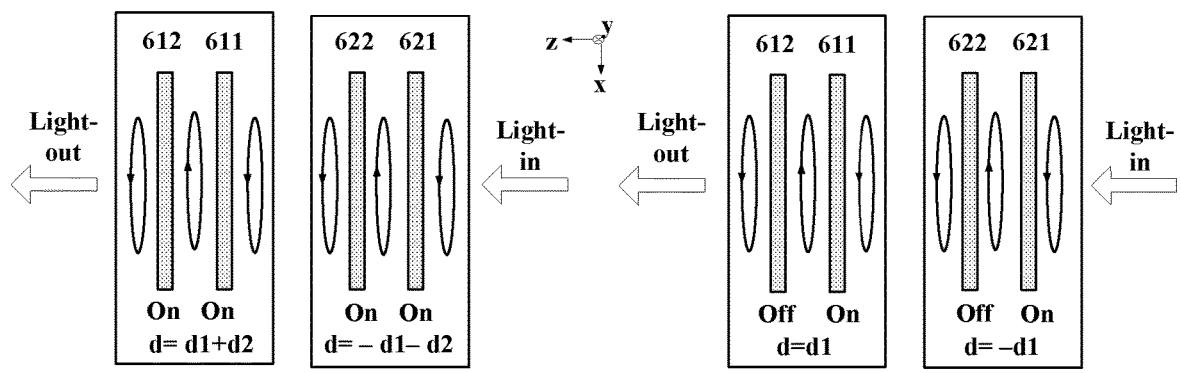
Figure 6Q:
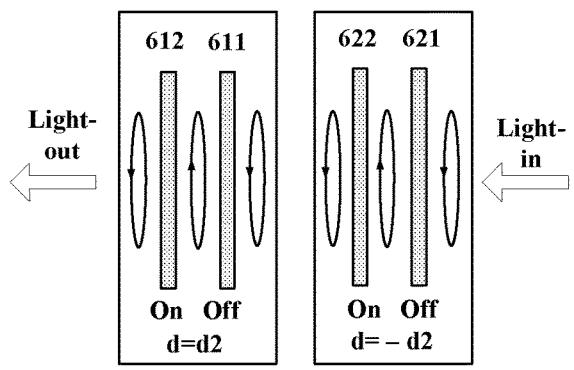

FIGS. 6B-6Q illustrate Exemplary optical adjustments of the multifocal block 600 in FIG. 6A, where "On" represents a lens switched-on state with a certain optical power, and "Off" represents a lens switched-off state with zero optical power. In each adaptive lens assembly, d1 and d2 (d1>0, d2>0) represent the absolute value of the optical power of the first lens and the second lens respectively, and d represent the stacked/total/combined optical power of the adaptive lens assembly.

In some embodiments, each lens in the first adaptive lens assembly 610 and the second adaptive lens assembly 620 may be a linear polarization dependent or polarization independent active LC lens. Polarization of light does not usually change after transmitting through linear polarization dependent LC lens and, thus, it is easy to stack multiple lenses with unchanged polarization. Also, the total optical power of each adaptive lens assembly may be a sum of the optical power of the lenses. Exemplary optical adjustments of the adaptive lens assemblies are shown in FIGS. 6B-6D.

As shown in FIGS. 6B-6D, the stack of two active LC lenses in the first adaptive lens assembly 610 may maximally give three positive stacked optical power plus one zero stacked optical power (zero optical power is not used in this application): d1+d2, d1 or d2. In particular, after the first lens 611 and the second lens 612 are both switched to the lens switched-on state "On" (named as "On-state" for short in the following description), the positive optical power d1 of the first lens 611 and the positive optical power d2 of the second lens 612 may be combined, such that the first adaptive lens assembly 610 may provide the stacked optical power of (d1+d2). When the first lens 611 and the second lens 612 are in On-state alternatively, the first adaptive lens assembly 610 may provide the stacked optical power associated with first lens 611 and the second lens 612 (i.e., d1 or d2), respectively.

Accordingly, in the second adaptive lens assembly 620, active LC lenses with opposite optical power may be used, i.e., −d1 and −d2, and the corresponding stacked optical power of the second adaptive lens assembly 620 may be −(d1+d2), −d1 or −d2. In particular, after one or more lenses in the first adaptive lens assembly 610 are in On-state to provide positive optical power, one or more lenses in the second adaptive lens assembly 620 may also be configured to be in On-state, thereby providing corresponding negative stacked optical power to compensate the positive stacked optical power of the first adaptive lens assembly 610.

For example, as FIG. 6B shows, after the first lens 611 with optical power of d1 and the second lens 612 with optical power of d2 in the first adaptive lens assembly 610 are both switched to On-state, the first lens 621 with optical power of −d1 and the second lens 622 with optical power of −d2 in the second adaptive lens assembly 620 may also be both switched to On-state. As FIGS. 6C-6D show, when the second lens 612 with optical power of d2 and the first lens 611 with optical power of d1 in the first adaptive lens assembly 610 are alternatively switched to On-state, the second lens 622 with optical power of −d2 and the first lens 621 with optical power of −d1 in the second adaptive lens assembly 620 may also be alternatively switched to On-state.

In some embodiments, the first adaptive lens assembly 610 may include an active LC lens which is switchable between a diverging lens of negative optical power and zero optical power. However, the first adaptive lens assembly 610 may still provide two positive optical power when the diverging lens has the absolute value of its optical power smaller than that of the other converging lens. For example, the first adaptive lens assembly 610 may include a converging lens of optical power d1 and a diverging lens of optical power −d2 (d1>d2), and the stacked optical power may be switched between (d1−d2) and d1. Accordingly, the second adaptive lens assembly 620 may be configured to include a converging lens of optical power d2 and a diverging lens of optical power −d1, thereby providing negative stacked optical power of (−d1+d2) or −d1.

In some embodiments, each adaptive lens assembly may include a passive lens with non-switchable optical power. The exemplary optical power adjustments of the adaptive lens assemblies are shown in FIGS. 6E-6F. As shown in FIGS. 6E-6F, the second lens 612 in the first adaptive lens assembly 610 may be a passive lens (P) with positive optical power d2, and the second lens 622 in the second adaptive lens assembly 620 may be a passive lens (P) with negative optical power −d2. The passive lens (P) may be a conventional lens, or a polarization dependent or a polarization independent LC lens.

In some embodiments, in the first adaptive lens assembly 610, the first lens 611 (active lens) and the second lens 612 (passive lens P) may be a converging lens of optical power d1 and a converging lens of optical power d2, respectively, such that the stacked optical power may be switched between (d1+d2) and d2. Correspondingly, in the second adaptive lens assembly 620, the first lens 621 (active lens) and the second lens 622 (passive lens P) may be a diverging lens of optical power −d1 and a diverging lens of optical power −d2, respectively, such that the stacked optical power may be switched between (−d1−d2) and −d2.

In some embodiments, in the first adaptive lens assembly 610, the first lens 611 (active lens) and the second lens 612 (passive lens P) may be a diverging lens of optical power −d1 and a converging lens of optical power d2, respectively, such that the stacked optical power may be switched between (−d1+d2) and d2 (d2>d1). Correspondingly, in the second adaptive lens assembly 620, the first lens 621 (active lens) and the second lens 622 (passive lens P) may be a converging lens of optical power d1 and a diverging lens of optical power −d2, respectively, such that the stacked optical power may be switched between (d1−d2) and −d2. For purposes of illustration, FIGS. 6E-6F merely illustrate the optical power of the first adaptive lens assembly 610 is switched between d1+d2 and d2.

In some embodiments, each lens in the adaptive lens assemblies may be an active PBP LC lens which is circular polarization dependent. The stacked optical power of each adaptive lens assembly may be switched by alternately switching different active PBP LC lens to the lens switched-off state "Off" (named as "Off-state" for short in the following description). In particular, the active PBP LC lens may be switched to Off-state by out-of-plane switching (as shown in FIG. 4D) or in-plane switching (as shown in FIG. 4E). Exemplary optical adjustments of the adaptive lens assemblies are shown in FIGS. 6G-6H.

As shown in FIGS. 6G-6H, after the two active PBP LC lenses in each adaptive lens assembly are alternatively switched to Off-state by out-of-plane switching, two stacked optical power associated with the first lens and the second lens may be achieved, respectively. Note the light changes the handedness after transmitting through each adaptive lens assembly, and the handedness of the transmitted light is the same for both optical power, which may simplify the design of the adaptive lens assemblies. For example, the first adaptive lens assembly 610 and the second adaptive lens assembly 620 may be configured to have an identical design. Provided that each lens in the first adaptive lens assembly 610 and the second adaptive lens assembly 620 is a converging lens (i.e., in the additive state) in response to the right circularly polarized (RCP) light, and a diverging lens (i.e., in the subtractive state) in response to the left circularly polarized (LCP) light, the second adaptive lens assembly 620 may alternately provide negative stacked optical power (i.e., −d1 or −d2) and, meanwhile, reverse the handedness of the transmitted light from LCP light to RCP light. Because of the reversed handedness, the lenses of first adaptive lens assembly 610 identical to the lenses of the second adaptive lens assembly 620 may exhibit corresponding positive power (i.e., d1 or d2). Thus, the first adaptive lens assembly 610 and the second adaptive lens assembly 620 may mutually compensate each other for real-world images.

In some embodiments, as shown in FIG. 6I, provided that each lens in the second adaptive lens assembly 620 is a diverging lens for the LCP light and a converging lens for the RCP light, after the first lens 621 and the second lens 622 are both switched to the On-state, the stacked optical power of the second adaptive lens assembly 620 may be −d1+d2 (d1>d2) for the incident LCP light. Meanwhile, the light transmitted through the second adaptive lens assembly 620 and incident onto the first lens 611 of the first adaptive lens assembly 610 may also be LCP light. To compensate the second adaptive lens assembly 620 for the real-world images, in some embodiments, each lens in the first adaptive lens assembly 610 may be configured in the flipped-over position of the corresponding lens in the second adaptive lens assembly 620. For example, the first lens 611 and the second lens 612 in the first adaptive lens assembly 610 may be configured in the flipped-over position of the first lens 621 and the second lens 622 in the second adaptive lens assembly 620, respectively. Then each lens in the first adaptive lens assembly 610 may be a converging lens for the LCP light and a diverging lens for the RCP light. Thus, the stacked optical power of the first adaptive lens assembly 610 may be (d1−d2) for the incident LCP light.

In some embodiments, as shown in FIG. 6J, to compensate the second adaptive lens assembly 620 for the real-world images, the first adaptive lens assembly 610 and the second adaptive lens assembly 620 may still be configured to have an identical design. However, a half-wave plate 630 capable of reversing the handedness of the transmitted light may be disposed between the first adaptive lens assembly 610 and the second adaptive lens assembly 620. Thus, provided that each lens in the first adaptive lens assembly 610 and the second adaptive lens assembly 620 is a diverging lens for the LCP light and a converging lens for the RCP light, the stacked optical power of the first adaptive lens assembly 610 may be (d1−d2).

In some embodiments, each adaptive lens assembly may include a passive lens which is a conventional lens without changing the handedness of the transmitted light. Exemplary optical power adjustments of the adaptive lens assemblies are shown in FIGS. 6K-6L. As shown in FIGS. 6K-6L, in the first adaptive lens assembly 610, the first lens 611 may be a conventional passive lens (P) with fixed positive optical power d1, while the second lens 612 (active lens) may have optical power ±d2 (the sign of the optical power depends on handedness of incident light, d1>d2). The stacked optical power of the first adaptive lens assembly 610 may be switched between d1±d2 and d1. For purposes of illustration, FIGS. 6K-6L merely illustrate the stacked optical power of the first adaptive lens assembly 610 is switched between d1+d2 and d1.

Meanwhile, in the second adaptive lens assembly 620, the first lens 622 may be a conventional passive lens (P) with fixed negative optical power −d1, while the second lens 622 (active lens) may have optical power ±d2 (the sign of the optical power depends on handedness of incident light, d1>d2). The stacked optical power of the second adaptive lens assembly 620 may be switched between −(d1±d2) and −d1. For purposes of illustration, FIGS. 6K-6L merely illustrate the stacked optical power of the second adaptive lens assembly 620 is switched between −(d1+d2) and −d1.

In some embodiments, each adaptive lens assembly may include a passive lens, which is a passive PBP LC lens capable of changing the handedness of the transmitted light. Exemplary optical power adjustments of the adaptive lens assemblies are shown in FIGS. 6M-6N. As shown in FIGS. 6M-6N, in the first adaptive lens assembly 610, the first lens 611 may be a passive lens (P) with fixed optical power ±d1, while the second lens 612 (active lens) may have optical power ±d2 (the sign of the optical power d1 and d2 depend on handedness of incident light and the handedness of the LC orientations in the PBP LC lens). Provided that d1>d2, the stacked optical power of the first adaptive lens assembly 610 may be switched between d1±d2 and d1. For purposes of illustration, FIGS. 6M-6N merely illustrate the stacked optical power of the first adaptive lens assembly 610 is switched between d1−d2 and d1.

Meanwhile, in the second adaptive lens assembly 620, the first lens 622 may be a passive lens (P) with fixed optical power ±d1, while the second lens 622 may have optical power ±d2 (the sign of the optical power d2 and d1 depend on handedness of incident light and the handedness of the LC orientations in the PBP LC lens). Provided that d1>d2, the stacked optical power of the second adaptive lens assembly 620 may be switched between −(d1±d2) and −d1. For purposes of illustration, FIGS. 6M-6N merely illustrate the optical power of the second adaptive lens assembly 620 is switched between −d1+d2 and −d1.

In some embodiments, each active PBP LC lens in the adaptive lens assemblies may be switched to the Off-state by in-plane switching, such that the handedness of the circularly polarized light may be reversed after transmitting through each active PBP LC lens in the Off-state. Exemplary optical adjustments are shown in FIGS. 6O-6Q. As shown in FIGS. 6O-6Q, the handedness of the circularly polarized light may remain the same after transmitting through each adaptive lens assembly. Thus, the mutual compensation of the first adaptive lens assembly 610 and the second adaptive lens assembly 620 may be obtained by using converging lens in the first adaptive lens assembly 610 and diverging lenses in the second adaptive lens assembly 620. For example, the first adaptive lens assembly 610 and the second adaptive lens assembly 620 may use the same lenses, however, the lenses in the second adaptive lens assembly 620 may be set in the flipped-over position as compared to the lenses in the first adaptive lens assembly 610.

Figure 7A:
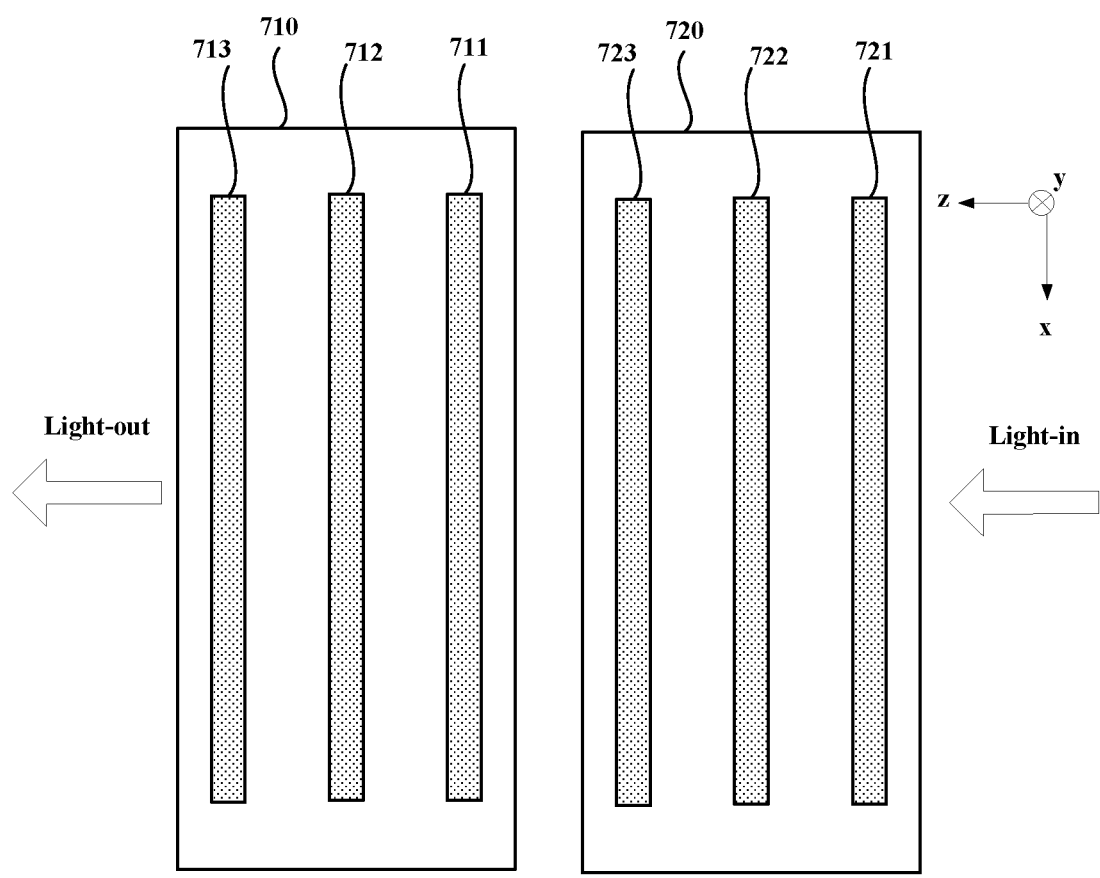
FIG. 7A illustrates another exemplary multifocal block consistent with the disclosed embodiments.
Figures 7I, 7J:
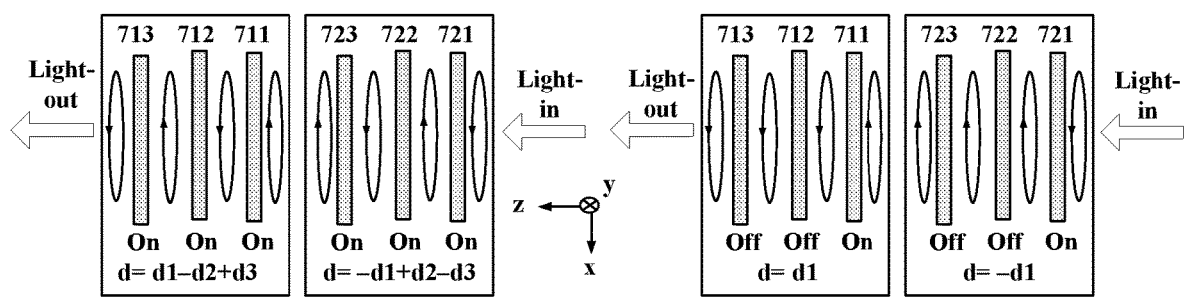
FIGS. 7B-7S illustrate exemplary optical power adjustments of the multifocal block in FIG. 7A consistent with the disclosed embodiments.
Figures 7K, 7L:
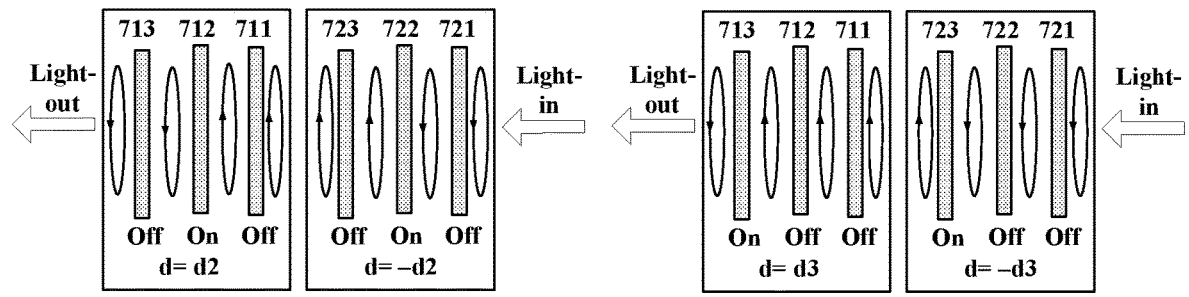
Figure 7M:
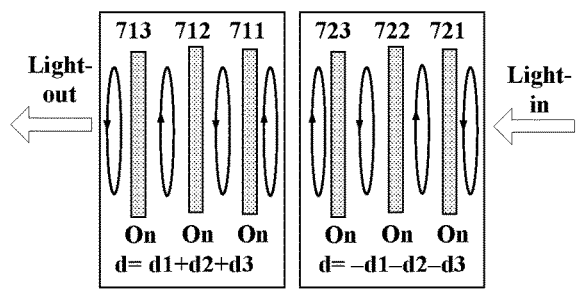
Figure 7N:
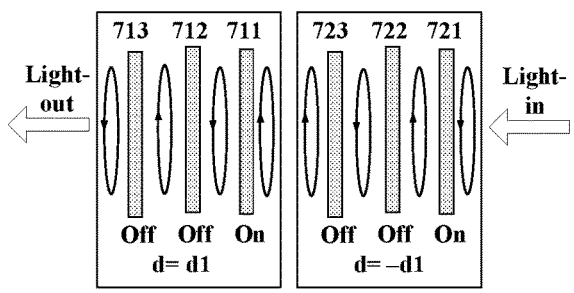
Figure 7O:
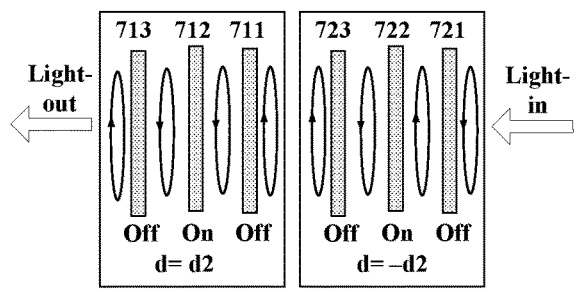
Figure 7P:
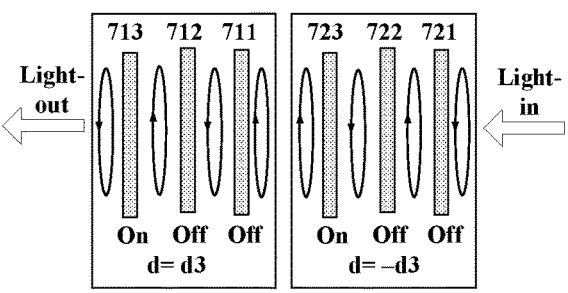

FIG. 7A illustrates another exemplary multifocal block 700 in accordance with an embodiment of the present disclosure. The similarities between FIG. 6A and FIG. 7A are not repeated here, while certain differences are further explained. As shown in FIG. 7A, the multifocal block 700 may include a first adaptive lens assembly 710 and a second adaptive lens assembly 720 arranged in optical series. The first adaptive lens assembly 710 may include a first lens 711, a second lens 712 and a third lens 713 arranged in optical series, at least one of which may be an active LC lens having a plurality of optical states. The second adaptive lens assembly 720 may include a first lens 721, a second lens 722 and a third lens 723 arranged in optical series, at least one of which may be an active LC lens having a plurality of optical states.

Figure 7Q:
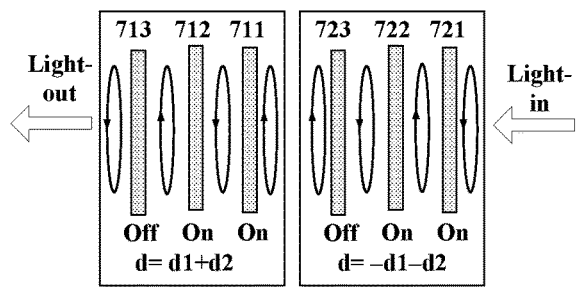
Figure 7R:
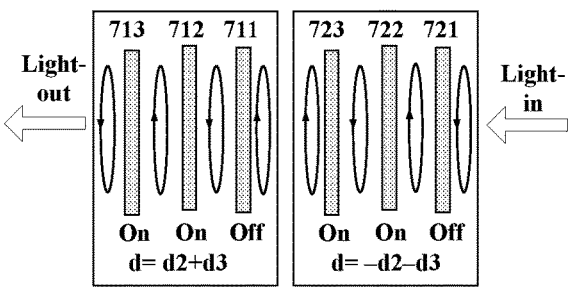
Figure 7S:
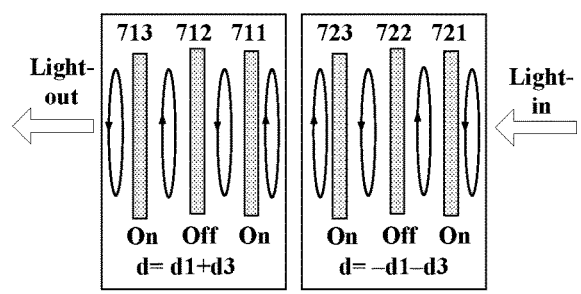

FIGS. 7B-7Q illustrate exemplary optical power adjustments of the multifocal block in FIG. 7A, where "On" represents a lens switched-on state with a certain optical power, and "Off" represents a lens switched-off state with zero optical power. In each adaptive lens assembly, d1, d2 and d3 (d1>0, d2>0, d3>0) represent the absolute value of the optical power of the first lens, the second lens and the third lens, respectively, and d represents the stacked/total/combined optical power of the adaptive lens assembly.

In some embodiments, at least two of the three lenses in each adaptive lens assembly may be active LC lenses that are switchable between a lens switched-on state with non-zero optical power and a lens switched-off state with zero optical power, and each adaptive lens assembly may be configured to provide no more than seven discrete values of optical power.

In some embodiments, each lens in the adaptive lens assemblies each may be a linear polarization dependent or polarization independent active LC lens, and the stacked optical power of each adaptive lens assembly may be a sum of the optical power of the lenses. Exemplary optical adjustments of the adaptive lens assemblies are shown in FIGS. 7B-7H. As shown in FIGS. 7B-7H, through switching the three active LC lenses 711-713 in the first adaptive lens assembly 710, the first adaptive lens assembly 710 may maximally provide seven stacked positive optical power plus one zero optical power (zero optical power is not used in this application): d1+d2+d3, d1+d2, d1+d3, d2+d3, d1, d2, or d3 (d1>0, d2>0, d3>0). Accordingly, the three active LC lenses 721-722 in the second adaptive lens assembly 720 may be configured to provide corresponding negative stacked optical power: −(d1+d2+d3), −(d1+d2), −(d1+d3), −(d2+d3), −d1, −d2, or −d3, thereby compensating the distortion of real-world images caused by the first adaptive lens assembly 710 in AR/MR HMDs.

In some embodiments, each lens in the first adaptive lens assembly 710 and the second adaptive lens assembly 720 may be an active PBP LC lens, and the stacked optical power in each adaptive lens assembly may be switched by alternately switching off different active PBP LC lenses. In some embodiments, the active PBP LC lens may be switched to the Off-state by out-of-plane switching (shown in FIG. 4D). Exemplary optical adjustments of the adaptive lens assemblies are shown in FIGS. 7I-7L. For purpose of illustration, FIGS. 7I-7L merely show certain stacked optical power of the adaptive lens assembly in which each active BPB LC lens is configured to provide positive optical power in response to RCP light and negative optical power in response to LCP light. Depending on the handedness of the incident circularly polarized light and the handedness of the LC orientations in the active PBP LC lens in each adaptive lens assembly, other stacked optical power may be obtained.

As shown in FIGS. 7I-7L, in the first adaptive lens assembly 710, after the three active PBP LC lenses 711-713 are all switched to On-state, the stacked optical power of the first adaptive lens assembly 710 may be (d1−d2+d3) (d1+d3>d2). After the three active PBP LC lenses 711-713 are alternatively switched to the Off-state by out-of-plane switching, three stacked optical power associated with the first BPB active LC lens 711 to the third BPB active LC lens 713 may be provided, respectively, i.e., d1, d2, or d3. Accordingly, in the second adaptive lens assembly 720, the three active PBP LC lenses 721-723 may be configured to provide corresponding negative stacked optical power (−d1+d2−d3), −d1, −d2, or −d3, thereby compensating the distortion of real-world images caused by the first adaptive lens assembly 710 in AR/MR HMDs.

In some embodiments, the active PBP LC lens may be switched to Off-state by in-plane switching (as shown in FIG. 4E). Exemplary optical adjustments of the adaptive lens assemblies are shown in FIGS. 7M-7S. For purpose of illustration, FIGS. 7M-7S merely show certain exemplary stacked optical power of the adaptive lens assembly in which the first BPB active LC lens and the third BPB active LC lens in each adaptive lens assembly are configured to provide positive optical power in response to RCP light and negative optical power in response to LCP light, while the second BPB active LC lens in each adaptive lens assembly is configured to provide positive optical power in response to LCP light and negative optical power in response to RCP light. Depending on the handedness of the incident circularly polarized light and the handedness of the LC orientations in the active PBP LC lens in each adaptive lens assembly, other stacked optical power of the adaptive lens assembly may be obtained.

As shown in FIGS. 7M-7S, the first adaptive lens assembly 710 may maximally provide seven positive stacked optical power. In particular, in the first adaptive lens assembly 710, after the three active PBP LC lenses 711-713 are all switched to On-state, the stacked optical power of the first adaptive lens assembly 710 may be (d1+d2+d3). After only one of the three active PBP LC lenses 711-713 is switched to On-state while the other two are switched to Off-state by in-plane switching, three stacked optical power associated with the first BPB active LC lens 711 to the third BPB active LC lens 713 may be achieved, respectively, i.e., d1, d2, or d3. After two of the three active PBP LC lenses 711-713 are switched to On-state while the other one is switched to Off-state by in-plane switching, three stacked optical power associated with the first BPB active LC lens 711 to the third BPB active LC lens 713 may be achieved, respectively, i.e., d1+d2, d2+d3, or d1+d3. Accordingly, in the second adaptive lens assembly 720, the three active PBP LC lenses 721-723 may be configured to provide corresponding negative stacked optical power: (−d1−d2−d3), −d1, −d2, −d3, −(d1+d2), −(d2+d3), or −(d1+d3), thereby compensating the e distortion of real-world images caused by the first adaptive lens assembly 710 in AR/MR HMDs.

Figure 8:
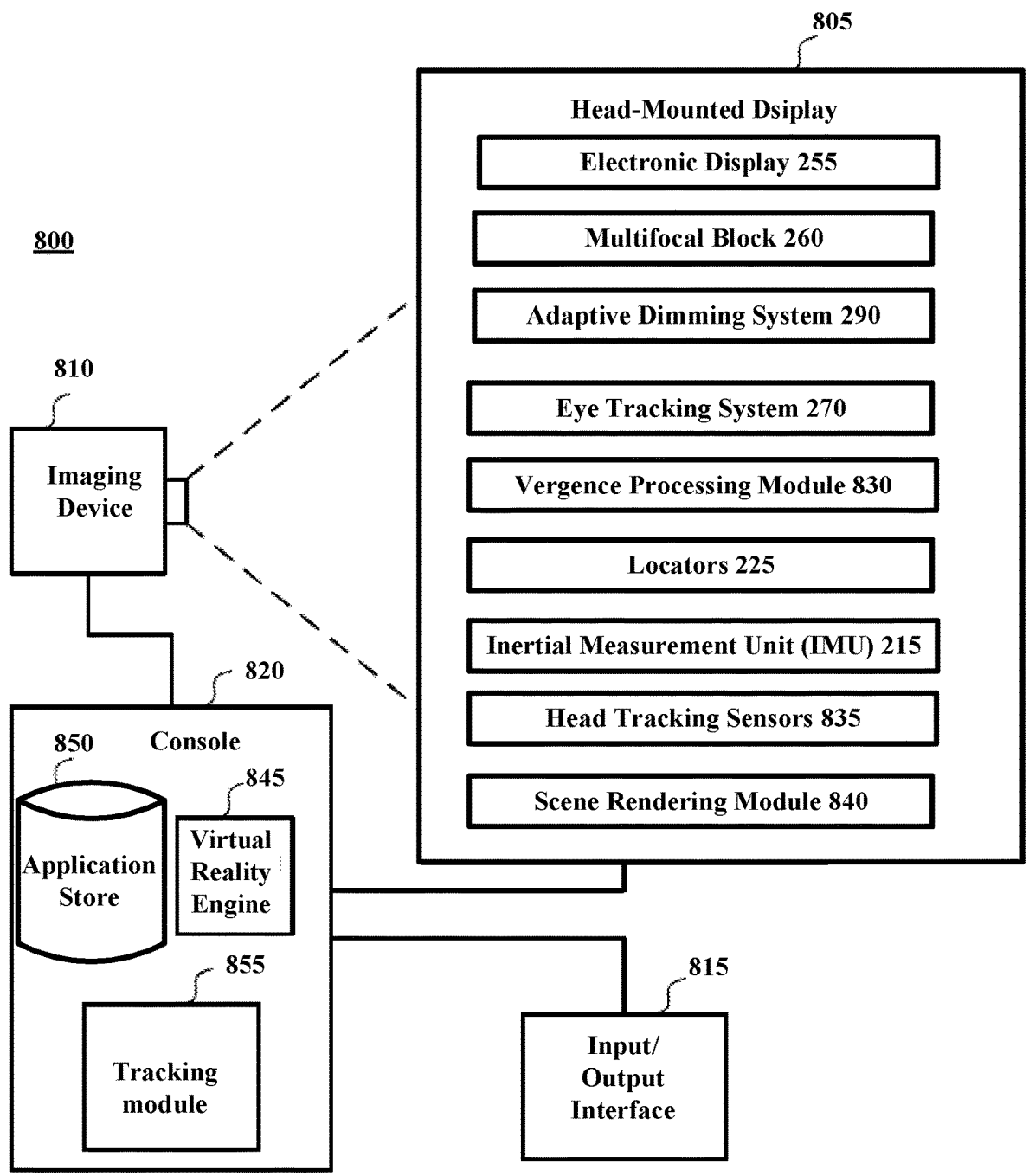
FIG. 8 illustrates an exemplary multifocal system in which an HMD operates consistent with the disclosed embodiments.

FIG. 8 is multifocal system 800 in which an HMD 805 operates. The multifocal system 800 may be for use as a virtual reality (VR) system, an augmented reality (AR) system, a mixed reality (MR) system, or some combination thereof. As shown in FIG. 8, the multifocal system 800 may include the HMD 805, an imaging device 810, and an input interface 815, which are each coupled to a console 820. Although FIG. 8 shows a single HMD 805, a single imaging device 810, and a single input interface 815, in other embodiments, any number of these components may be included in the system. For example, there may be multiple HMDs 805 each having an associated input interface 815 and being monitored by one or more imaging devices 460, with each HMD 805, input interface 815, and imaging devices 460 communicating with the console 820. In alternative configurations, different and/or additional components may also be included in the multifocal system 800. The HMD 805 may act as a VR, AR, and/or a MR HMD.

The HMD 805 may present content to a user. In some embodiments, the HMD 805 may be an embodiment of the HMD 200 described above with reference to FIGS. 2A and 2B. Example content includes images, video, audio, or some combination thereof. Audio content may be presented via a separate device (e.g., speakers and/or headphones) external to the HMD 805 that receives audio information from the HMD 805, the console 820, or both. The HMD 805 may include an electronic display 255 (described above with reference to FIG. 2B), a multifocal block 260 (described above with reference to FIG. 2B), an eye tracking system 270, an adaptive dimming system 290, a vergence processing module 830, one or more locators 225, an internal measurement unit (IMU) 215, head tracking sensors 835, and a scene rendering module 840.

The multifocal block 260 may adjust its focal length by adjusting a focal length of one or more multifocal structures. As noted above with reference to FIGS. 6A-7S, for VR HMD applications, the multifocal block 260 may adjust its focal length by switching-on or off the active LC lenses, adjusting the handedness of the light incident onto the PBP LC lens, adjusting the handedness of the LC orientations in the PBP LC lens, or adjusting the switching-off mode of the PBP LC lens or some combination thereof in the first adaptive lens assembly. The multifocal block 260 may adjust its focal length responsive to instructions from the console 820. Note that a varifocal tuning speed of a multifocal structure is limited by a tuning speed of the active LC lenses. For AR/MR HMD applications, as noted above with reference to FIGS. 6A-7S, the multifocal block 260 may further adjust its focal length by switching-on or off the active LC lenses, adjusting the handedness of the light incident onto the PBP LC lens, adjusting the handedness of the LC orientations in the PBP LC lens, or adjusting the switching-off mode of the PBP LC lens or some combination thereof in the second adaptive lens assembly, such that the real-world objects viewed through the AR/MR HMDs 805 may stay unaltered.

The eye tracking system 270 may track an eye position and eye movement of a user of the HMD 805. A camera or other optical sensor (that is part the eye tracking system 270) inside the HMD 805 may capture image information of a user's eyes, and eye tracking system 270 may use the captured information to determine interpupillary distance, interocular distance, a three dimensional (3D) position of each eye relative to the HMD 805 (e.g., for distortion adjustment purposes), including a magnitude of torsion and rotation (i.e., roll, pitch, and yaw) and gaze directions for each eye. In one example, infrared light may be emitted within the HMD 805 and reflected from each eye. The reflected light may be received or detected by the camera and analyzed to extract eye rotation from changes in the infrared light reflected by each eye. Many methods for tracking the eyes of a user may be used by eye tracking system 270. Accordingly, the eye tracking system 270 may track up to six degrees of freedom of each eye (i.e., 3D position, roll, pitch, and yaw), and at least a subset of the tracked quantities may be combined from two eyes of a user to estimate a gaze point (i.e., a 3D location or position in the virtual scene where the user is looking). For example, the eye tracking system 270 may integrate information from past measurements, measurements identifying a position of a user's head, and 3D information describing a scene presented by the electronic display 255. Thus, information for the position and orientation of the user's eyes is used to determine the gaze point in a virtual scene presented by the HMD 805 where the user is looking.

The adaptive dimming system 290 may include a dimming element. The dimming element may dynamically adjust the transmittance of the real-world objects viewed through the HMD 805, thereby switching the HMD 805 between a VR device and an AR device or between a VR device and a MR device. In some embodiments, along with switching between the AR/MR device and the VR device, the dimming element may be used in the AR device to mitigate difference in brightness of real and virtual objects.

The vergence processing module 830 may determine a vergence distance of a user's gaze based on the gaze point or an estimated intersection of the gaze lines determined by the eye tracking system 270. Vergence is the simultaneous movement or rotation of both eyes in opposite directions to maintain single binocular vision, which is naturally and automatically performed by the human eye. Thus, a location where a user's eyes are verged is where the user is currently looking and is also typically the location where the user's eyes are currently focused. For example, the vergence processing module 830 may triangulate the gaze lines to estimate a distance or depth from the user associated with intersection of the gaze lines. Then the depth associated with intersection of the gaze lines may be used as an approximation for the accommodation distance, which identifies a distance from the user where the user's eyes are directed. Thus, the vergence distance may allow the determination of a location where the user's eyes should be focused.

The locators 225 may be objects located in specific positions on the HMD 805 relative to one another and relative to a specific reference point on the HMD 805. A locator 225 may be a light emitting diode (LED), a corner cube reflector, a reflective marker, a type of light source that contrasts with an environment in which the HMD 805 operates, or some combination thereof. Active locators 225 (i.e., LED or other type of light emitting device) may emit light in the visible band (~380 nm to 850 nm), in the infrared (IR) band (~750 nm to 1 mm), in the ultraviolet band (~10 nm to 380 nm), some other portion of the electromagnetic spectrum, or some combination thereof.

The locators 225 may be located beneath an outer surface of the HMD 805, which is transparent to the wavelengths of light emitted or reflected by the locators 225 or is thin enough not to substantially attenuate the wavelengths of light emitted or reflected by the locators 225. Further, the outer surface or other portions of the HMD 805 may be opaque in the visible band of wavelengths of light. Thus, the locators 225 may emit light in the IR band while under an outer surface of the HMD 805 that is transparent in the IR band but opaque in the visible band.

The IMU 215 may be an electronic device that generates fast calibration data based on measurement signals received from one or more of the head tracking sensors 835, which generate one or more measurement signals in response to motion of HMD 805. Examples of the head tracking sensors 835 include accelerometers, gyroscopes, magnetometers, other sensors suitable for detecting motion, correcting error associated with the IMU 215, or some combination thereof. The head tracking sensors 835 may be located external to the IMU 215, internal to the IMU 215, or some combination thereof.

Based on the measurement signals from the head tracking sensors 835, the IMU 215 may generate fast calibration data indicating an estimated position of the HMD 805 relative to an initial position of the HMD 805. For example, the head tracking sensors 835 may include multiple accelerometers to measure translational motion (forward/back, up/down, left/right) and multiple gyroscopes to measure rotational motion (e.g., pitch, yaw, and roll). The IMU 215 may, for example, rapidly sample the measurement signals and calculate the estimated position of the HMD 805 from the sampled data. For example, the IMU 215 may integrate measurement signals received from the accelerometers over time to estimate a velocity vector, and integrate the velocity vector over time to determine an estimated position of a reference point on the HMD 805. The reference point may be a point that may be used to describe the position of the HMD 805. While the reference point may generally be defined as a point in space, in various embodiments, a reference point is defined as a point within the HMD 805 (e.g., a center of the IMU 630). Alternatively, the IMU 215 may provide the sampled measurement signals to the console 820, which determines the fast calibration data.

The IMU 215 may additionally receive one or more calibration parameters from the console 820. As further discussed below, the one or more calibration parameters may be used to maintain tracking of the HMD 805. Based on a received calibration parameter, the IMU 215 may adjust one or more of the IMU parameters (e.g., sample rate). In some embodiments, certain calibration parameters may cause the IMU 215 to update an initial position of the reference point to correspond to a next calibrated position of the reference point. Updating the initial position of the reference point as the next calibrated position of the reference point may help to reduce accumulated error associated with determining the estimated position. The accumulated error, also referred to as drift error, may cause the estimated position of the reference point to "drift" away from the actual position of the reference point over time.

The scene rendering module 840 may receive content for the virtual scene from a VR engine 845, and provide the content for display on the electronic display 255. Additionally, the scene rendering module 840 may adjust the content based on information from the vergence processing module 830, the IMU 215, and the head tracking sensors 835. The scene rendering module 840 may determine a portion of the content to be displayed on the electronic display 255, based on one or more of the tracking module 855, the head tracking sensors 835, or the IMU 215, as described further below.

The imaging device 810 may generate slow calibration data in accordance with calibration parameters received from the console 820. Slow calibration data may include one or more images showing observed positions of the locators 225 that are detectable by imaging device 810. The imaging device 810 may include one or more cameras, one or more video cameras, other devices capable of capturing images including one or more locators 225, or some combination thereof. Additionally, the imaging device 810 may include one or more filters (e.g., for increasing signal to noise ratio). The imaging device 810 may be configured to detect light emitted or reflected from the locators 225 in a field of view of the imaging device 810. In embodiments where the locators 225 include passive elements (e.g., a retroreflector), the imaging device 810 may include a light source that illuminates some or all of the locators 225, which retroreflect the light towards the light source in the imaging device 810. Slow calibration data may be communicated from the imaging device 810 to the console 820, and the imaging device 810 may receive one or more calibration parameters from the console 820 to adjust one or more imaging parameters (e.g., focal length, focus, frame rate, ISO, sensor temperature, shutter speed, aperture, etc.).

The input interface 815 may be a device that allows a user to send action requests to the console 820. An action request may be a request to perform a particular action. For example, an action request may be to start or end an application or to perform a particular action within the application. The input interface 815 may include one or more input devices. Example input devices include a keyboard, a mouse, a game controller, or any other suitable device for receiving action requests and communicating the received action requests to the console 820. An action request received by the input interface 815 may be communicated to the console 820, which performs an action corresponding to the action request. In some embodiments, the input interface 815 may provide haptic feedback to the user in accordance with instructions received from the console 820. For example, haptic feedback may be provided by the input interface 815 when an action request is received, or the console 820 may communicate instructions to the input interface 815 causing the input interface 815 to generate haptic feedback when the console 820 performs an action.

The console 820 may provide content to the HMD 805 for presentation to the user in accordance with information received from the imaging device 810, the HMD 805, or the input interface 815. In one embodiment, as shown in FIG. 8, the console 820 may include an application store 850, a tracking module 855, and the VR engine 845. Some embodiments of the console 820 have different or additional modules than those described in conjunction with FIG. 8. Similarly, the functions further described below may be distributed among components of the console 820 in a different manner than is described here.

The application store 850 may store one or more applications for execution by the console 820. An application may be a group of instructions, that when executed by a processor, generates content for presentation to the user. Content generated by an application may be in response to inputs received from the user via movement of the HMD 805 or the input interface 815. Examples of applications include gaming applications, conferencing applications, video playback application, or other suitable applications.

The tracking module 855 may calibrate the multifocal system 800 using one or more calibration parameters and may adjust one or more calibration parameters to reduce error in determining position of the HMD 805. For example, the tracking module 855 may adjust the focus of the imaging device 810 to obtain a more accurate position for observed locators 225 on the HMD 805. Moreover, calibration performed by the tracking module 855 may also account for information received from the IMU 215. Additionally, when tracking of the HMD 805 is lost (e.g., imaging device 810 loses line of sight of at least a threshold number of locators 225), the tracking module 855 may re-calibrate some or all of the multifocal system 800 components.

Additionally, the tracking module 855 may track the movement of the HMD 805 using slow calibration information from the imaging device 810, and determine positions of a reference point on the HMD 805 using observed locators from the slow calibration information and a model of the HMD 805. The tracking module 855 may also determine positions of the reference point on the HMD 805 using position information from the fast calibration information from the IMU 215 on the HMD 805. Additionally, the tracking module 855 may use portions of the fast calibration information, the slow calibration information, or some combination thereof, to predict a future location of the HMD 805, which is provided to the VR engine 845.

The VR engine 845 may execute applications within the multifocal system 800 and receives position information, acceleration information, velocity information, predicted future positions, or some combination thereof for the HMD 805 from the tracking module 855. Based on the received information, the VR engine 845 may determine content to provide to the HMD 805 for presentation to the user, such as a virtual scene, one or more virtual objects to overlay onto a real-world scene, etc.

In some embodiments, the VR engine 845 may maintain focal capability information of the multifocal block 260. Focal capability information is information that describes what focal distances are available to the multifocal block 260. Focal capability information may include, e.g., a range of focus that the multifocal block 260 is able to accommodate (e.g., 0 to 4 diopters), combinations of settings for each active LC lens and/or passive lens that map to particular focal planes; or some combination thereof.

The VR engine 845 may generate instructions for the multifocal block 260, the instructions causing the multifocal block 260 to adjust its focal distance to a particular location. The VR engine 845 may generate the instructions based on focal capability information and, e.g., information from the vergence processing module 830, the IMU 215, and the head tracking sensors 835. The VR engine 845 may use the information from the vergence processing module 830, the IMU 215, and the head tracking sensors 835, or some combination thereof, to select a focal plane to present content to the user. The VR engine 845 may then use the focal capability information to determine the settings of each active LC lens and/or passive lens in each adaptive lens assembly or some combination thereof, within the multifocal block 260 that are associated with the selected focal plane. The VR engine 845 may generate instructions based on the determined settings, and provide the instructions to the multifocal block 260.

Additionally, the VR engine 845 may perform an action within an application executing on the console 820 in response to an action request received from the input interface 815, and provide feedback to the user that the action was performed. The provided feedback may be visual or audible feedback via the HMD 805 or haptic feedback via VR input interface 815.

Figure 9:
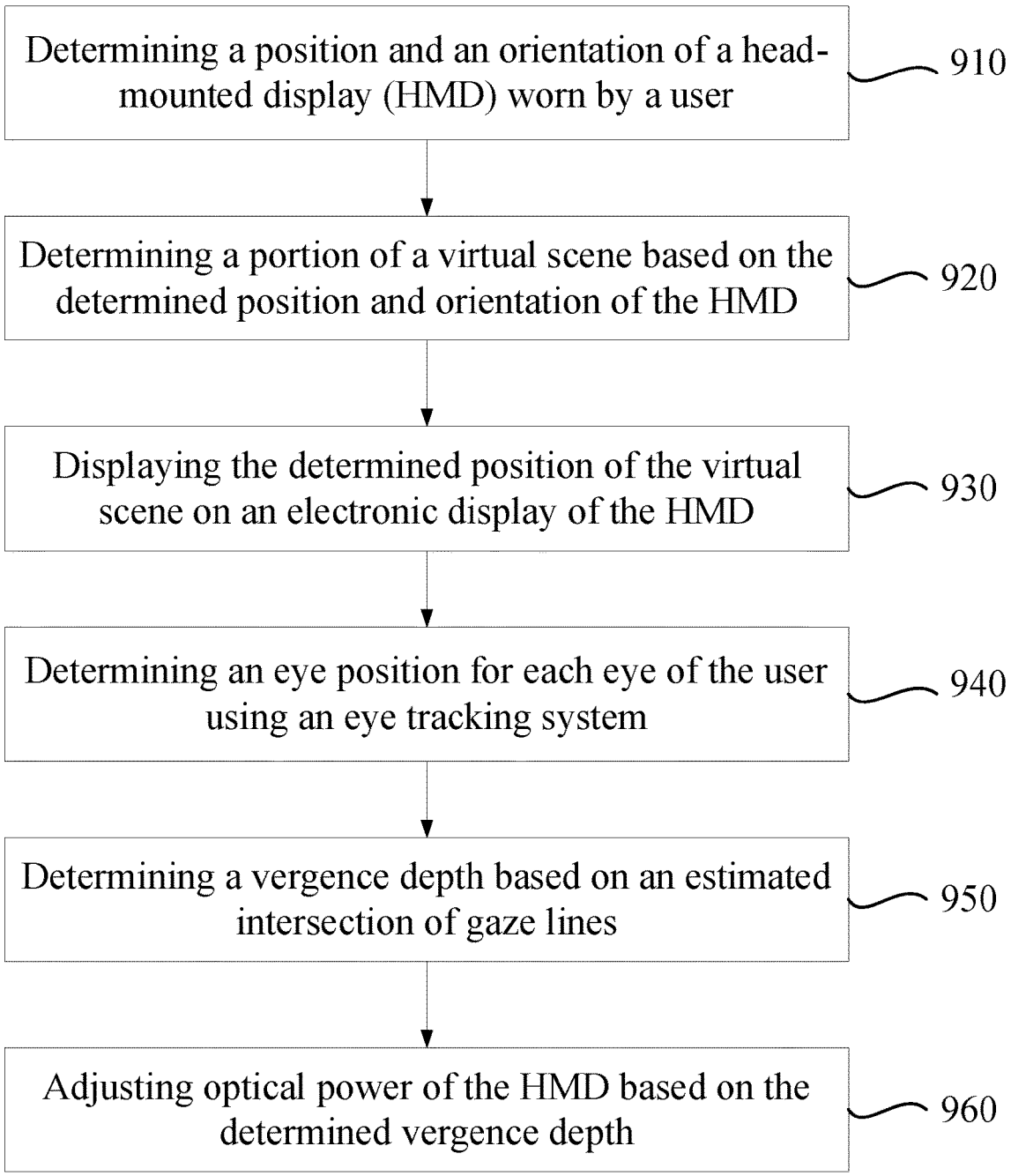
FIG. 9 illustrates an exemplary process for mitigating vergence-accommodation conflict by adjusting the focal length of an HMD consistent with the disclosed embodiments.

FIG. 9 is a process 900 for mitigating vergence-accommodation conflict by adjusting the focal length of an HMD 805, in accordance with an embodiment. The process 900 may be performed by the multifocal system 800 in some embodiments. Alternatively, other components may perform some or all of the steps of the process 900. For example, in some embodiments, an HMD 805 and/or a console (e.g., console 820) may perform some of the steps of the process 900. Additionally, the process 900 may include different or additional steps than those described in conjunction with FIG. 9 in some embodiments or perform steps in different orders than the order described in conjunction with FIG. 9. Additionally, the process 900 may include different or additional steps than those described in conjunction with FIG. 9 in some embodiments or perform steps in different orders than the order described in conjunction with FIG. 9.

As discussed above in FIG. 8, the multifocal system 800 may dynamically vary its focus to bring images presented to a user wearing the HMD 805 into focus through adjusting the first adaptive lens assembly, which keeps the user's eyes in a zone of comfort as vergence and accommodation change. Additionally, eye tracking in combination with the variable focus of the multifocal system 800 may allow blurring to be introduced as depth cues in images presented by the HMD 805. Additionally, when the HMD 805 acts as an AR device or a MR device, the multifocal system 800 may adjust the second adaptive lens assembly to compensate the first adaptive lens assembly, such that the real-world objects viewed through the HMD 805 may stay unaltered.

As shown in FIG. 9, the multifocal system 800 may determine a position, an orientation, and/or a movement of HMD 805 (Step 910). The position may be determined by a combination of the locators 225, the IMU 215, the head tracking sensors 835, the imagining device 810, and the tracking module 855, as described above in conjunction with FIG. 8.

The multifocal system 800 may determine a portion of a virtual scene based on the determined position and orientation of the HMD 805 (Step 920). The multifocal system 800 may map a virtual scene presented by the HMD 805 to various positions and orientations of the HMD 805. Thus, a portion of the virtual scene currently viewed by the user may be determined based on the position, orientation, and movement of the HMD 805.

The multifocal system 800 may display the determined portion of the virtual scene being on an electronic display (e.g., the electronic display 255) of the HMD 805 (Step 930). In some embodiments, the portion may be displayed with a distortion correction to correct for optical error that may be caused by the image light passing through the multifocal block 260. Further, the multifocal block 260 may switch-on/off the active LC lenses, adjust the handedness of the light incident onto the PBP LC lens, adjust the handedness of the LC orientations in the PBP LC lens, adjust the switching-off mode of the PBP LC lens or some combination thereof in the first adaptive lens assembly, to provide focus and accommodation to the location in the portion of the virtual scene where the user's eyes are verged.

The multifocal system 800 may determine an eye position for each eye of the user using an eye tracking system (Step 940). The multifocal system 800 may determine a location or an object within the determined portion at which the user is looking to adjust focus for that location or object accordingly. To determine the location or object within the determined portion of the virtual scene at which the user is looking, the HMD 805 may track the position and location of the user's eyes using image information from an eye tracking system (e.g., eye tracking system 270). For example, the HMD 805 may track at least a subset of a 3D position, roll, pitch, and yaw of each eye, and use these quantities to estimate a 3D gaze point of each eye.

Figure 10:
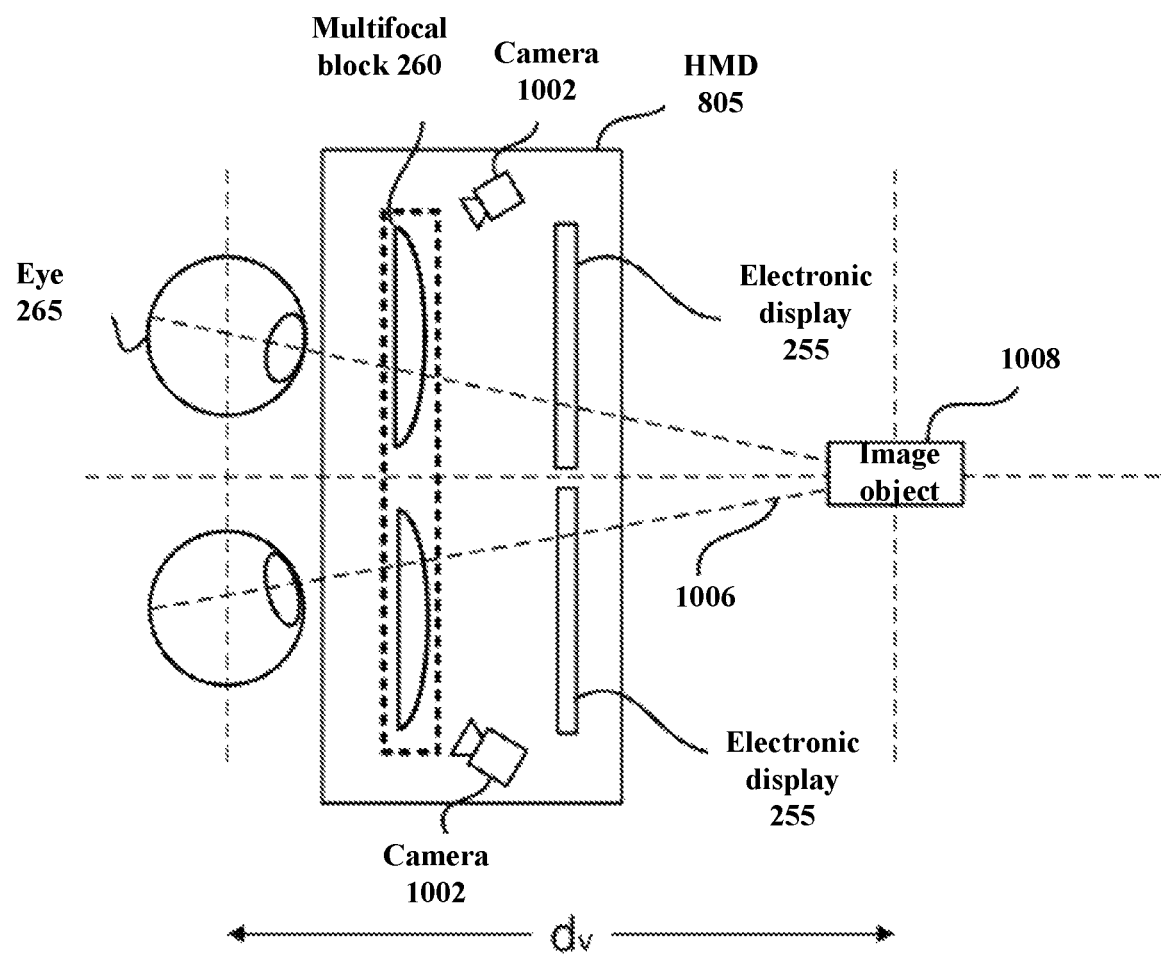
FIG. 10 illustrates an exemplary process for mitigating vergence-accommodation conflict by adjusting a focal length of a multifocal block that includes multifocal structures consistent with the disclosed embodiments.

The multifocal system 800 may determine a vergence distance based on an estimated intersection of gaze lines (Step 950). For example, FIG. 10 shows a cross section of an embodiment of the HMD 805 that includes camera 1002 for tracking a position of each eye 265, the electronic display 255, and the multifocal block 260 that includes two multifocal structures, as described with respect to FIG. 2B. As swoon in FIG. 10, the camera 1002 may capture images of the user's eyes looking at an image object 1008, and the eye tracking system 270 may determine an output for each eye 265 and gaze lines 1006 corresponding to the gaze point or location where the user is looking based on the captured images. Accordingly, vergence distance (dv) of the image object 1008 (also the user's gaze point) may be determined 850 based on an estimated intersection of the gaze lines 1006. As shown in FIG. 10, the gaze lines 1006 may converge or intersect at the distance dv, where the image object 1008 is located. In some embodiments, information from past eye positions, information describing a position of the user's head, and information describing a scene presented to the user may also be used to estimate the 3D gaze point of an eye in various embodiments.

Returning to FIG. 9, based on the determined vergence distance, the multifocal system 800 may adjust optical power of the HMD 805 (Step 960). In some embodiments, when the HMD acts as a VR device, the multifocal system 800 may adjust optical power of the HMD 805 through adjusting the stacked optical power of the first adaptive lens assembly in the multifocal block 260. In particular, the multifocal system 800 may select an image plane that matches the vergence distance by switching-on/off the active LC lenses, adjusting the handedness of the light incident onto the PBP LC lens, adjusting the handedness of the LC orientations in the PBP LC lens, adjusting the switching-off mode of the PBP LC lens or some combination thereof in the first adaptive lens assembly. As described above, the stacked optical power of the first adaptive lens assembly in the multifocal block 260 may be adjusted to change a focal distance of the HMD 805 to provide accommodation for the determined vergence distance corresponding to where or what in the displayed portion of the virtual scene the user is currently looking.

In some embodiments, when the HMD 805 acts as an AR device or a MR device, in addition to adjusting the stacked optical power of the first adaptive lens assembly, the multifocal system 800 may further adjust the stacked optical power of the second adaptive lens assembly according to the stacked optical power of the first adaptive lens assembly, such that the distortion of real-world images caused by the first adaptive lens assembly may be compensated, and the real-world objects viewed through the HMD 805 may stay unaltered. The stacked optical power of the second adaptive lens assembly may be adjusted to be opposite but have the same absolute value as the stacked optical power provided by the first adaptive lens assembly. Similarly, the stacked optical power of the second adaptive lens assembly in the multifocal block 260 may be adjusted by switching-on/off the active LC lenses, adjusting the handedness of the light incident onto the PBP LC lens, adjusting the handedness of the LC orientations in the PBP LC lens, adjusting the switching-off mode of the PBP LC lens or some combination thereof in the second adaptive lens assembly.

The foregoing description of the embodiments of the disclosure have been presented for the purpose of illustration. It is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A device, comprising:
    a transmissive first lens assembly controllable to switch between a first plurality of optical powers, wherein the first lens assembly comprises a plurality of directly optically coupled first lenses, and is configured to transmit a light while converging or diverging the light based on a polarization of the light; and
    a second lens assembly coupled with the first lens assembly, and comprising a plurality of directly optically coupled second lenses, wherein the second lens assembly is controllable to switch between a second plurality of optical powers that are opposite to the first plurality of optical powers.

2. The device of claim 1, further comprising a wave plate disposed between the first lens assembly and the second lens assembly.

3. The device of claim 2, wherein the wave plate is configured to convert a first light having a first polarization received from the first lens assembly to a second light propagating toward the second lens assembly, the second light having a second polarization orthogonal to the first polarization.

4. The device of claim 1, wherein at least one first lens of the plurality of directly optically coupled first lenses is switchable between a non-zero optical power state and a zero optical power state.

5. The device of claim 1, wherein at least one first lens of the plurality of directly optically coupled first lenses is a circular polarization dependent active liquid crystal ("LC") lens.

6. The device of claim 5, wherein the at least one first lens is configured to converge the light when the light is a circularly polarized incident light having a predetermined handedness, and diverge the light when the light is a circularly polarized incident light having a handedness that is opposite to the predetermined handedness.

7. The device of claim 1, wherein at least one first lens of the plurality of directly optically coupled first lenses is a linear polarization dependent active liquid crystal ("LC") lens.

8. The device of claim 1, wherein at least one first lens of the plurality of directly optically coupled first lenses is a polarization independent active liquid crystal ("LC") lens.

9. The device of claim 1, wherein:
    at least one first lens is switchable between a non-zero optical power state and a zero optical power state, and
    at least one second lens is switchable between a non-zero optical power state and a zero optical power state.

10. The device of claim 9, wherein both of the at least one first lens and the at least one second lens are circular polarization dependent active liquid crystal ("LC") lenses, linear polarization dependent active LC lenses, or polarization independent active LC lenses.

11. The device of claim 9, wherein the at least one first lens is substantially identical to the at least one second lens.

12. The device of claim 1, wherein the second lens assembly has the same number of lenses as the first lens assembly.

13. The device of claim 1, wherein the first lens assembly includes a passive lens.

14. A method, comprising:
    receiving a first light by a transmissive first lens assembly controllable to switch between a first plurality of optical powers, wherein the first lens assembly comprising a plurality of directly optically coupled first lenses; and
    converging or diverging the first light while transmitting the first light, by the first lens assembly based on a polarization of the first light, to a second lens assembly, the second lens assembly comprising a plurality of directly optically coupled second lenses and controllable to switch between a second plurality of optical powers that are opposite to the first plurality of optical powers.

15. The method of claim 14, further comprising:
    converging or diverging the first light while transmitting the first light, by the first lens assembly based on the polarization of the first light, to a wave plate disposed between the first lens assembly and the second lens assembly; and
    converting, by the wave plate, the first light into a second light propagating towards the second lens assembly.

16. The method of claim 15, further comprising:
    determining an optical power of the second lens assembly; and
    determining, based on the determined optical power of the second lens assembly, an optical power for the first lens assembly,
    wherein the optical power of the first lens assembly is a first optical power, and the optical power of the second lens assembly is a second optical power opposite to the first optical power.

17. The method of claim 16, further comprising:
    converging or diverging the first light while transmitting the first light, by the first lens assembly having the first optical power, based on the polarization of the first light, to the wave plate; and
    diverging or converging the second light while transmitting the second light, by the second lens assembly having the second optical power, based on the polarization of the second light.

18. The method of claim 16, wherein at least one first lens of the plurality of directly optically coupled first lenses in the first lens assembly is switchable between a non-zero optical power state and a zero optical power state, and the method further comprises:
    configuring an optical state of the at least one first lens to provide the first optical power.

19. The method of claim 18, wherein the at least one first lens is one of a circular polarization dependent active liquid crystal ("LC") lens, a linear polarization dependent active LC lens, or a polarization independent active LC lens.

* * * * *